(12) United States Patent
Morin et al.

(10) Patent No.: US 7,731,998 B2
(45) Date of Patent: *Jun. 8, 2010

(54) METHOD FOR REDUCING PROTEIN EXUDATE ON MEAT PRODUCT

(75) Inventors: Paul G. Morin, Madison, WI (US); Michele L. Reeve, Glenview, IL (US); Jennifer L. Tomey, Merom, IN (US); Daniel B. Wilke, Waunakee, WI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1187 days.

This patent is subject to a terminal disclaimer.

(21) Appl. No.: 11/061,688

(22) Filed: Feb. 18, 2005

(65) Prior Publication Data

US 2005/0255207 A1 Nov. 17, 2005

Related U.S. Application Data

(63) Continuation-in-part of application No. 10/644,624, filed on Aug. 20, 2003, now Pat. No. 7,169,421.

(51) Int. Cl.
*A22C 5/00* (2006.01)
(52) U.S. Cl. .................. 426/281; 426/641; 426/519
(58) Field of Classification Search ............... 426/274, 426/281, 302, 641–647, 516, 513, 519; 452/30–51
See application file for complete search history.

(56) References Cited

U.S. PATENT DOCUMENTS

| 377,546 | A | 2/1888 | Crane |
|---|---|---|---|
| 858,017 | A | 6/1907 | Pence |
| 2,538,891 | A | 1/1951 | Zimmerman et al. |
| 2,991,870 | A | 7/1961 | Griffith et al. |
| 3,014,437 | A | 12/1961 | Dutchess |
| 3,050,399 | A | 8/1962 | Kielsmeier et al. |
| 3,216,375 | A | 11/1965 | Ernst |
| 3,450,179 | A | 6/1969 | Golding |
| 3,548,903 | A | 12/1970 | Holly |
| 3,552,978 | A | 1/1971 | Inklaar |
| 3,565,637 | A * | 2/1971 | Artar .................... 426/646 |

(Continued)

FOREIGN PATENT DOCUMENTS

AU 9924991 4/1999

(Continued)

OTHER PUBLICATIONS

Irvin F. Snider, Mixing and More: The Continuous Co-Rotating Overlapping Twin-Screw Mixer, Powder and Bulk Engineering Magazine, Jan. 1999, USA, reproduced at http://www.readco.com/Mixing_and More.pdf (last visted Aug. 19, 2009) (4 pages).

(Continued)

*Primary Examiner*—Drew E Becker
(74) *Attorney, Agent, or Firm*—Fitch, Even, Tabin & Flannery

(57) ABSTRACT

A system and method for reducing protein exudate on meat product. The system utilizes input hoppers and eliminates standing time for the meats. The elimination of a standing time for curing or protein extraction eliminates the ability for visible surface protein exudate to form.

27 Claims, 15 Drawing Sheets

U.S. PATENT DOCUMENTS

| | | | |
|---|---|---|---|
| 3,599,687 A | 8/1971 | Tschantz | |
| 3,612,130 A | 10/1971 | Ponka et al. | |
| 3,647,190 A | 3/1972 | Iozzelli | |
| 3,649,300 A | 3/1972 | Olson et al. | |
| 3,690,623 A | 9/1972 | Boyne | |
| 3,759,105 A | 9/1973 | Wallace et al. | |
| 3,799,459 A | 3/1974 | Bakewell | |
| 3,825,231 A | 7/1974 | McFarland | |
| 3,879,150 A | 4/1975 | Brown et al. | |
| 3,885,665 A | 5/1975 | Fisher | |
| 3,897,723 A | 8/1975 | Lucy, Jr. et al. | |
| 3,901,483 A | 8/1975 | Lasar | |
| 3,920,223 A | 11/1975 | Krueger | |
| 3,924,836 A | 12/1975 | Bruning et al. | |
| 3,942,768 A | 3/1976 | Hughes | |
| 3,971,514 A | 7/1976 | Martinelli et al. | |
| 3,992,985 A | 11/1976 | McFarland | |
| 4,013,234 A | 3/1977 | Fay | |
| 4,032,049 A | 6/1977 | Roberts | |
| 4,036,477 A | 7/1977 | Sieradzki et al. | |
| 4,085,482 A * | 4/1978 | Charron | 452/142 |
| 4,168,431 A | 9/1979 | Henriksen | |
| 4,171,164 A | 10/1979 | Groves et al. | |
| 4,201,484 A | 5/1980 | Sasiela et al. | |
| 4,226,540 A | 10/1980 | Barten et al. | |
| 4,264,631 A * | 4/1981 | Rose | 426/247 |
| 4,269,582 A | 5/1981 | Mella | |
| 4,314,451 A | 2/1982 | Leeds et al. | |
| 4,332,823 A | 6/1982 | Buemi | |
| 4,356,206 A | 10/1982 | Boldt | |
| 4,382,404 A | 5/1983 | Hawley et al. | |
| 4,409,704 A | 10/1983 | Seiffhart | |
| 4,429,836 A | 2/1984 | Goransson | |
| 4,441,231 A | 4/1984 | Baccetti | |
| 4,443,109 A | 4/1984 | Watts | |
| 4,473,299 A | 9/1984 | Guibert | |
| 4,476,686 A | 10/1984 | Madsen et al. | |
| 4,500,558 A * | 2/1985 | Fulger et al. | 426/622 |
| 4,508,454 A | 4/1985 | Anders | |
| 4,508,545 A | 4/1985 | DeLoach | |
| 4,518,262 A | 5/1985 | Bornemann et al. | |
| 4,523,520 A | 6/1985 | Hofmann et al. | |
| 4,539,210 A | 9/1985 | O'Connell et al. | |
| 4,544,279 A | 10/1985 | Rudolph | |
| 4,548,507 A | 10/1985 | Mathis et al. | |
| 4,606,647 A | 8/1986 | Frye | |
| 4,606,648 A | 8/1986 | Coyle et al. | |
| 4,674,887 A | 6/1987 | Liicke et al. | |
| 4,708,268 A | 11/1987 | Wurtz | |
| 4,733,607 A | 3/1988 | Star et al. | |
| 4,747,342 A | 5/1988 | Schack et al. | |
| 4,813,860 A | 3/1989 | Jonsson et al. | |
| 4,844,619 A | 7/1989 | Lesar et al. | |
| 4,904,496 A | 2/1990 | Izzo et al. | |
| 4,908,234 A | 3/1990 | Daussan et al. | |
| 4,927,661 A * | 5/1990 | Bradshaw et al. | 426/641 |
| 4,944,657 A * | 7/1990 | Mowli | 417/203 |
| 4,987,850 A | 1/1991 | McCracken | |
| 5,080,922 A | 1/1992 | Hosokawa | |
| 5,083,506 A | 1/1992 | Horn et al. | |
| 5,100,067 A | 3/1992 | Konig et al. | |
| RE34,172 E | 2/1993 | Gwinn et al. | |
| 5,240,324 A | 8/1993 | Phillips et al. | |
| 5,286,514 A | 2/1994 | Webb et al. | |
| 5,318,358 A | 6/1994 | Wobbe et al. | |
| 5,323,694 A | 6/1994 | Higashimoto | |
| 5,324,108 A | 6/1994 | Baumgarten | |
| 5,332,308 A | 7/1994 | Scheuring | |
| 5,358,693 A | 10/1994 | Brinkmann et al. | |
| 5,382,444 A | 1/1995 | Roehrig et al. | |
| 5,384,149 A | 1/1995 | Lin | |
| 5,401,402 A | 3/1995 | Christy et al. | |
| 5,407,268 A | 4/1995 | Henrich | |
| 5,433,968 A | 7/1995 | Zarraga et al. | |
| RE35,048 E | 10/1995 | Rudibaugh | |
| 5,494,351 A | 2/1996 | Hakasalo | |
| 5,505,542 A | 4/1996 | Braeker et al. | |
| 5,527,107 A | 6/1996 | Weibel et al. | |
| 5,564,332 A | 10/1996 | Ludwig | |
| 5,652,007 A * | 7/1997 | Pleva | 426/265 |
| 5,657,687 A | 8/1997 | Callebaut et al. | |
| 5,673,564 A | 10/1997 | Fradin | |
| 5,698,255 A | 12/1997 | Roehrig et al. | |
| 5,707,145 A | 1/1998 | Liicke et al. | |
| 5,773,070 A * | 6/1998 | Kazemzadeh | 426/573 |
| 5,775,986 A | 7/1998 | Law et al. | |
| 5,800,055 A | 9/1998 | Sato | |
| 5,820,041 A | 10/1998 | Moessmer et al. | |
| 5,894,999 A | 4/1999 | Moessmer et al. | |
| 5,913,602 A | 6/1999 | Steele | |
| 5,925,400 A | 7/1999 | Gundlach et al. | |
| 5,939,112 A | 8/1999 | Katayama et al. | |
| 5,953,984 A | 9/1999 | Moessmer et al. | |
| 5,972,398 A | 10/1999 | Ludwig et al. | |
| 5,981,269 A | 11/1999 | Park | |
| 6,043,444 A | 3/2000 | Nutt et al. | |
| 6,090,418 A | 7/2000 | Gundlach et al. | |
| 6,099,159 A | 8/2000 | Yoshida et al. | |
| 6,287,188 B1 | 9/2001 | Righele et al. | |
| 6,322,244 B1 | 11/2001 | Marchesini et al. | |
| 6,387,306 B1 | 5/2002 | Morohashi et al. | |
| 6,550,959 B2 | 4/2003 | Huber et al. | |
| 6,588,926 B2 | 7/2003 | Huber et al. | |
| 6,588,928 B2 | 7/2003 | Huber et al. | |
| 6,616,320 B2 | 9/2003 | Huber et al. | |
| 6,635,301 B1 | 10/2003 | Howsam | |
| 6,648,501 B2 | 11/2003 | Huber et al. | |
| 6,688,217 B2 | 2/2004 | Hauck et al. | |
| 7,123,685 B2 | 10/2006 | Ostergaard et al. | |
| 7,169,421 B2 * | 1/2007 | Tomey et al. | 426/231 |
| 7,282,235 B2 | 10/2007 | Lombard et al. | |
| 7,448,795 B2 | 11/2008 | Wenger et al. | |
| 7,488,502 B2 | 2/2009 | Morin et al. | |
| 7,521,076 B1 | 4/2009 | Wenger et al. | |
| 2002/0075754 A1 | 6/2002 | Huber et al. | |
| 2002/0075755 A1 | 6/2002 | Huber et al. | |
| 2002/0093118 A1 | 7/2002 | Inoue et al. | |
| 2002/0176318 A1 | 11/2002 | Huber et al. | |
| 2002/0176319 A1 | 11/2002 | Huber et al. | |
| 2002/0181321 A1 | 12/2002 | Huber et al. | |
| 2002/0181324 A1 | 12/2002 | Huber et al. | |
| 2003/0170357 A1 | 9/2003 | Garwood | |
| 2003/0207006 A1 | 11/2003 | Jurgensen et al. | |
| 2004/0136261 A1 | 7/2004 | Huber et al. | |
| 2005/0249862 A1 | 11/2005 | Morin et al. | |
| 2005/0249863 A1 | 11/2005 | Morin et al. | |
| 2005/0249864 A1 | 11/2005 | Morin et al. | |
| 2005/0255207 A1 | 11/2005 | Morin et al. | |
| 2005/0255221 A1 | 11/2005 | Morin et al. | |
| 2005/0255222 A1 | 11/2005 | Morin et al. | |
| 2005/0255224 A1 | 11/2005 | Morin et al. | |
| 2005/0276903 A1 | 12/2005 | Morin et al. | |
| 2007/0292559 A1 | 12/2007 | Garwood | |
| 2008/0095910 A1 | 4/2008 | Wenger et al. | |
| 2008/0159875 A1 | 7/2008 | Wilke | |
| 2008/0223223 A1 | 9/2008 | Wenger et al. | |

FOREIGN PATENT DOCUMENTS

| | | |
|---|---|---|
| AU | 9924991 | 11/1999 |
| EP | 0325315 | 7/1989 |
| EP | 0380706 | 8/1990 |
| EP | 0565710 | 10/1993 |
| EP | 0674539 | 10/1995 |

| | | |
|---|---|---|
| EP | 0700639 | 3/1996 |
| EP | 0700639 A1 | 3/1996 |
| EP | 0700725 | 3/1996 |
| EP | 0700725 A1 | 3/1996 |
| EP | 0674539 | 12/1997 |
| EP | 0870431 | 10/1998 |
| EP | 0924992 | 6/1999 |
| EP | 0962149 | 12/1999 |
| EP | 1071358 | 1/2001 |
| EP | 1100346 | 5/2001 |
| EP | 1269853 | 1/2003 |
| EP | 1269853 A1 | 1/2003 |
| EP | 1361804 | 11/2003 |
| EP | 1 402 782 A1 | 3/2004 |
| EP | 1402782 | 3/2004 |
| IE | 970904 | 3/1998 |
| JP | 63209549 | 8/1988 |
| JP | 63222656 | 9/1988 |
| JP | 1-128764 | 5/1989 |
| JP | 1128764 | 5/1989 |
| JP | 3-127966 | 5/1991 |
| JP | 3127966 | 5/1991 |
| JP | 4-104774 | 4/1992 |
| JP | 4104774 | 4/1992 |
| JP | 4-206030 | 7/1992 |
| JP | 4206030 | 7/1992 |
| RU | 2115319 | 7/1998 |
| RU | 2166854 | 5/2001 |
| RU | 2166858 | 5/2001 |
| RU | 2 204 917 | 5/2003 |
| RU | 2204917 | 5/2003 |
| SU | 1669522 | 8/1991 |
| WO | 79/00345 | 6/1979 |
| WO | WO 79/00345 | 6/1979 |
| WO | 87/00733 | 2/1987 |
| WO | WO 87/00733 | 2/1987 |
| WO | 90/01267 | 2/1990 |
| WO | WO 90/01267 | 2/1990 |
| WO | 93/08695 | 11/1991 |
| WO | 92/15393 | 9/1992 |
| WO | WO 92/15393 | 9/1992 |
| WO | WO 93/08695 | 5/1993 |
| WO | WO 95/19710 | 1/1995 |
| WO | 95/19710 | 7/1995 |
| WO | 98/05217 | 2/1998 |
| WO | WO 98/05217 | 2/1998 |
| WO | WO 99/51135 | 10/1999 |
| WO | 01/33974 | 5/2001 |
| WO | WO 01/33974 | 5/2001 |
| WO | 01/62096 | 8/2001 |
| WO | WO 01/62096 A1 | 8/2001 |
| WO | 02/49748 | 6/2002 |
| WO | WO 02/49748 A1 | 6/2002 |
| WO | 02/065860 | 8/2002 |
| WO | WO 02/065860 A1 | 8/2002 |
| WO | WO 02/081922 A2 | 8/2002 |
| WO | 02/081922 | 10/2002 |
| WO | 02/094025 | 11/2002 |
| WO | 02/094513 | 11/2002 |
| WO | WO 02/094025 A1 | 11/2002 |
| WO | WO 02/094513 A2 | 11/2002 |
| WO | WO 2003/092389 A1 | 1/2003 |
| WO | 03/061400 | 7/2003 |
| WO | WO 03/061400 A1 | 7/2003 |
| WO | 03/092389 | 11/2003 |
| WO | 2004/016097 | 2/2004 |
| WO | WO 2004/016097 A1 | 2/2004 |
| WO | 2004/082403 | 9/2004 |
| WO | WO 2004/082403 A1 | 9/2004 |

OTHER PUBLICATIONS

Processing Meat Products, Processing Techniques for Meat Products, http://www.ansci.uiuc.edu/meatscience/Library/processing%20meat%20products.htm (last visited Apr. 24, 2003) (4 pages).

Sausage Manufacturing, Sausage Manufacturing, http://savell-j.tamu.edu/sausage.html (last visited Apr. 24, 2003) (8 pages).

C. Lynn Knipe, Phosphates as Meat Emulsion Stabilizers, from Phosphates as Emulsifiers, Encyclopaedia of Food Science, Food Technology, and Nutrition, 1992, Academic Press Limited, London, reproduced at OSU Meat Science: Phosphates as Meat Emulsion Stabilizers, http://www.ag.ohio-state.edu/~meatsci/archive/phoschap.html (last visited Apr. 24, 2003) (5 pages).

Weiler and Company, Inc., GMS In-Line Analysis System, Product Brochure, Feb. 2001 (12 pages).

ESE Inc., ESE Analytical, Product Brochure, Marshfield, Wisconsin (3 pages).

Gerald Offer & John Trinick, On the Mechanism of Water Holding in Meat: The Swelling and Shrinking of Myofibrils, Meat Science, 1983, pp. 245-281, vol. 8, Applied Science Publishers Ltd., Great Britain (37 pages).

Alan Sharp & Gerald Offer, The Mechanism of Formation of Gels from Myosin Molecules, Science Food Agriculture, 1992, pp. 63-73, vol. 1 (11 pages).

* cited by examiner

Fig. 13

| CONDITION | PADDLE CONFIG. | MIX STEPS | RPM | OPENING | FLOWRATE LBS/MIN | BATTER TEMPERATURES °F MIXED | BATTER TEMPERATURES °F EMULSIFIED | BATTER TEMPERATURES °F DELTA T | CIB STABILITY FAT COOKOUT > 2mL/100g (MIN) |
|---|---|---|---|---|---|---|---|---|---|
| 1 | MIXER 400 | 1 | 100 | 3/4" | 50.0 | 46 | 72-78 | 26-32 | 5 |
| 2 | MIXER 400 | 1 | 100 | 1/4" | 50.0 | 46 | 76-78 | 30-32 | 5 |
| 3 | MIXER 300 | 2 | 100 | 3/4" | 50.0 | 46-47 | 75-77 | 28-31 | 3 |
| 4 | MIXER 300 | 2 | 100 | 1/4" | 50.0 | 46 | 76-77 | 30-31 | 4 |
| 5 | CONTROL | 2 | 50 | N/A | N/A | 48 | 67-86 | 19-38 | >6 |
| 6 | MIXER 500 | 1 | 360 | 5/16" | 50.0 | 49-51 | 80 | 29-31 | >6 |
| 7 | MIXER 500 | 1 | 360 | 2" | 50.0 | 48 | 78-79 | 30-31 | 6 |
| 8 | MIXER 500 | 1 | 100 | 1/4" | 50.0 | 46 | 76 | 30 | 5 |
| 9 | MIXER 600 | 1 | 360 | 1/4" | 50.0 | 50-51 | 79 | 28-29 | 7 |
| 10 | MIXER 200 | 1 | 360 | 1/4" | 50.0 | 47-48 | 76-79 | 28-32 | 6 |
| 11 | MIXER 200 | 2 | 360 | 1/4" | 50.0 | 46 | 76-84 | 30-38 | 7 |
| 12 | MIXER 200 | 1 | 360 | 1/4" | 50.0 | 46 | 76 | 30 | 4 |
| 13 | MIXER 600 | 1 | 360 | 1/4" | 50.0 | 50 | 80 | 30 | 8 |
| 14 | MIXER 600 | 1 | 360 | 1/4" | 25.0 | 56 | 79-80 | 23-24 | >8 |
| 15 | MIXER 600 | 2 | 360 | 1/4" | 50.0 | 50 | 80 | 30 | 6 |
| 16 | CONTROL | 2 | 50 | N/A | N/A | 47 | 77 | 30 | 8 |
| 17 | MIXER 700 | 1 | 360 | 1/4" | 50.0 | 51-52 | 79 | 27-28 | 8 |
| 18 | MIXER 700 | 1 | 360 | 1/4" | 37.5 | 52-53 | 80 | 27-28 | 8 |
| 19 | MIXER 700 | 1 | 360 | 1/4" | 25 | 57-58 | 79-80 | 21-23 | 8 |
| 20 | MIXER 700 | 1 | 360 | 1/4" | 15 | 67 | BOWL CHOPPED | | |

METHOD FOR REDUCING PROTEIN EXUDATE ON MEAT PRODUCT

CROSS-REFERENCE TO RELATED APPLICATIONS

This is a continuation-in-part of U.S. patent application Ser. No. 10/644,624, filed Aug. 20, 2003, titled "Meat Processing System Method of Making Processed Meat Products" issued as U.S. Pat. No. 7,169,421, which is hereby incorporated by reference.

FIELD OF THE INVENTION

The invention relates to a method for processing meat and, in particular, to a method of processing meat that eliminates visible protein exudate formation on the meat and meat products.

BACKGROUND OF THE INVENTION

In commercial systems for making certain processed meat products such as bologna and hot dogs, raw meat in the form of chunks or pieces and other ingredients such as spices are ground, chopped and/or otherwise blended with one or more salt solutions or brine to provide a mixture that can subsequently be formed into a stable meat emulsion or protein matrix. Similar steps of grinding, chopping and/or otherwise working are also employed in making coarse ground products such as sausages, whole muscle products such as processed ham and processed turkey, and other processed meat products. In each case, protein forms a matrix to hold or bond the separate pieces together.

A stable protein matrix requires the protein bonds to suspend or bond with fat and water. Creation of protein bonds in this context requires a process commonly known as protein extraction. In this process, salt soluble or salt-extractable and heat coagulable proteins such as myosin, actomyosin, and actin bind water, swell and become tacky as a result of working or blending of the meat in the presence of a salt or a salt solution. The proteins are subsequently set when heated to create a bond. Other myofibrillar proteins, as well as sarcoplasmic or water soluble or extractable proteins, may also play a role in bonding. Salt solutions that may be used in protein extraction include, but are not limited to, sodium chloride, sodium pyrophosphate or diphosphate, potassium chloride, sodium lactate, and potassium lactate. In protein extraction as described herein, the mechanism believed to be primarily responsible for creation of the bonds involves binding proteins, salts, fats, and/or water and subsequent swelling of the proteins, rather than solution of the proteins. More precisely, it is believed that the salt solution frees bonding sites on the proteins for bonding with each other, as well as with water and fat. The particles of the cooked product are bound to each other by the proteins to provide integrity to the final meat product.

As used herein, a stable meat protein matrix refers to a mixture that retains a large percentage of its components during further processing, including cooking, and during its shelf-life as a final product. For instance, an emulsion is considered stable if less than 2% of the product weight is lost due to fat cook-out from the cooking stage. If the protein matrix is unstable, either it or the final product will lose excessive quantities of water or fat. An unstable protein matrix leads to yield loss and to a final product that is not able to maintain sufficient integrity over its desired shelf-life.

Conventional batch processing is a lengthy process requiring a number of discrete steps. Initially, various meats are provided by a vendor with specified contents. More specifically, the meats are provided with a specified protein, fat, and/or water content, typically a percentage by weight. A batch sheet is provided to processing plant personnel indicating what mixture of meats, water, and additives are to be combined for one of a variety of meat products.

Though purchasing is done outside of the processing plant, the batch sheet is based on knowledge of the meats presently on-hand at the plant. However, the batch sheet often needs to be adjusted. For instance, a particular vendor may provide meat rated as 70% protein, while the actual meat has a slightly different content such as 68% protein. Because the batch sheet is based on the purchasing and the meat rating provided by the vendor, the plant personnel often have to adjust the meats selected for the meat product based on the formula desired for the final product. The final product mixture is carefully controlled. For instance, a particular product, such as hot dogs, may have no more than 30% fat by weight. If a particular meat is utilized where the fat content is greater than what the batch sheet calls for, the final product may have an excessive amount of fat. To avoid this, the plant personnel would increase the protein provided by other meats to balance the fat content.

Unfortunately, this is not necessarily a sufficiently precise approach. Each meat, as well as each chunk in a batch of meat, may vary significantly from a sample taken and assumed to be average. Once the water and other additives are mixed in with the batch, it may be difficult to alter the balance. At times, the resulting batch is determined to be inaccurately mixed, and remedial procedures must be taken such as mixing the batch in with additional correction materials. In order to reduce the likelihood of an imprecise batch, relatively large quantities of meat are provided for a single batch in hopes of minimizing or driving to a mean the composition deviation resulting from a meat portion with an aberrational content. A typical amount of a particular meat for a batch is approximately 2000 lbs.

Batch processes for blending meat and other ingredients and extracting protein are well known. A known method for achieving protein extraction and ingredient blending for whole muscle products such as processed turkey and processed ham involves puncturing the whole muscle meat with hypodermic type needles, injecting brine through the needles, and using a batch processor or mixer to work the meat for approximately 45 minutes under vacuum to remove air, as discussed below. For coarse ground and emulsified products, meat is ground and added to a batch processor with water, salt solution, spices, and/or other ingredients and worked with or without vacuum for up to an hour, or e.g., 15 to 45 minutes.

A large batch mixer may process approximately 6,000-12,000 pounds per hour. The meat product constituents including the meats and the additives are combined in the low shear batch mixer. This mixing stage typically requires 30-60 minutes of being mixed. It is during this time that the constituents are transformed into a mixture that will form a stable protein matrix.

A stable protein matrix is formed when mixtures for each of whole muscle products, coarse ground products, and emulsified products allow the salt solution to reach the salt-extractable protein. This process, known as curing, achieves the protein extraction. For whole muscle products, injection with needles inserted into the meat chunks to deliver the brine solution is a relatively imprecise method for attempting to reduce a distance of the meat through which the salt solution must diffuse. The curing stage typically requires 24-48 hours for satisfactory diffusion, and the batches are stored in vats placed in coolers for the cure time. Once the protein extraction has occurred, the mixture may then be further processed.

Input constituents are calculated to result in a specific quantity of cooked product. If excessive water or fat is lost post-mix such as during the cook stage, the carefully regulated water, fat, and meat ratios will be off-target. If fat is lost prior to the cook stage, it often remains in the machinery or piping through which the mixture is processed. This can result in down time for the machinery, likelihood of damaged machinery, and greater labor in cleaning the machinery. Furthermore, cooked emulsified products rely, to some degree, on non-protein or non-bound materials to provide the proper texture. The proteins bind to form a matrix with each other and, in the absence of sufficient fat or water, these bonds may form a larger, stronger matrix, which leads the product to become somewhat rubbery. Conversely, if there is too much water, the cooked product may be too soft, and may lack integrity.

As used herein, the term additives may refer broadly to brine solution, water without salt, a spice slurry, nitrite, or other additives. Though the brine solution and the meats themselves each include water, the balance for the final product is typically adjusted with a quantity of water. The spice slurry provides, for instance, flavorings. One additive is typically nitrite which is used as a preservative and to provide a desired color. Other inert additives, such as corn starch or non-functional proteins, may also be included.

As the mixture constituents are churned in the mixer for up to an hour, contact with air may produce a froth on the surface of the meat pieces. A final product having visible air may be unacceptable. In some cases, the product must be re-processed and mixed in with subsequent batches. Air in the product may appear as surface bubbles, or as surface holes. Entrapped air may also lead to product swelling during cooking, or may lead to the product having visible air bubbles within its interior.

Air affects the product in other ways, as well. For instance, some proteins are denatured by the presence of air, which reduces the functionality of the meat for binding fat and water. The air can also react with the nitrite to retard the development of the proper color. The resulting color may then be undesirable or objectionable to consumers.

To avoid air being stirred into the mixture, vacuum pressure may be applied during the mixing process. This requires an extensive set up including the vacuum itself and seals to maintain the pressure. The vacuum system and seals require maintenance, and occasionally leak which results in downgraded product.

While such mixers have been used commercially for many years, they have significant drawbacks. For example, one of the problems is that air may undesirably be drawn into the product. Other drawbacks for the mixers include their space requirements and cost due to their large size, labor costs, the length of time required for processing each batch, vat handling and transfer yield loss, and the time and expense associated with cleaning of the apparatus.

SUMMARY

The invention relates to improved methods and apparatus for use in making processed meat products that provide significant advantages with respect to the size of the apparatus, the time required for processing, the control of the process, and/or other aspects of the manufacturing process.

In one embodiment, a method and apparatus provides for accelerating the formation of stable meat mixtures for meat products. Input constituent streams such as meats, water, salt solution, spices, and other ingredients are input into a mixer. The constituents are subjected to high shear force in the presence of a brine solution. The high shear force distorts the shape and may reduce the size of the pieces of meat so that the intimate contact of proteins and salt solution may occur. The intimate contact results in effective and efficient protein extraction and mixing of the constituents in a relatively brief dwell or mixer-residence time, which may be on the order of less than a minute. In this manner, a stable and functional meat protein matrix including extracted protein is quickly produced for each of the emulsified products, coarse ground products, and whole muscle products.

In another embodiment, a method and apparatus are provided for reducing the time for ingredient diffusion in the meats. The input constituents including the meats are worked and deformed under high shear force so that the protein strands become unraveled and porous, thus making them susceptible to infusions of the salt solution and the ingredients. This results in a reduced time for processing of the meat while achieving proper dispersion and diffusion of the ingredients, including the salt solution necessary for protein extraction.

In accordance with embodiments of the present invention, the preferred apparatus includes rotating elements located on at least one rotatable mixing device located within a housing. Each mixing device may comprise a plurality of rotating mixing elements such as paddles, blades or screws, or may consist of a single element such as a single screw, blade or paddle. The mixing devices may be removably supported on one or more shafts. To facilitate thorough cleaning of the apparatus without disassembly the elements are preferably integral with their associated shafts. In some embodiments, the mixing elements and shaft may be welded together or formed as a one-piece, unitary machined part.

One mixer in accordance with embodiments of the invention comprises a plurality of rotating mixing elements that force some or all of the mixture through one or more gaps of about 0.08" between the mixing elements and the interior of the mixer housing, and between various pairs of mixing elements, as the mixture advances through the apparatus.

The system preferably achieves sufficient protein extraction, blending, and in some cases maceration in less than 5 minutes of processing time, and is believed to be capable of achieving sufficient protein extraction, blending and maceration in less than one minute. In one particular embodiment, the processing time is about 45 seconds. The average time required for a given mixture portion to pass through the processor is about 10-60 seconds. Within that time, the mixer is capable of forming ingredients comprising chunks or pieces of raw meat, along with salt solution, water, spices, etc., into a mixture that, when cooked, will form a cohesive, self-supporting processed meat product without further protein extraction or maceration, also referred to as a stable protein matrix that retains a predictable and acceptable amount of fat and water. It should be noted that for some products, e.g., bologna and hot dogs, further processing steps may take place that may incidentally involve additional protein extraction.

In some embodiments, mixing may take place at pressure equal to or greater than atmospheric pressure without the meat mixture suffering from aeration. The constituents are fed into the mixer, and the dwell time therein is relatively low. As the mixture is in a relatively anaerobic environment, aeration of the mixture does not occur. This eliminates the issues attendant to air being present in the meat product, and eliminates the need for a vacuum system for the mixer. In other embodiments, the mixing operation may take place in a vacuum environment of, e.g., 25-29 in. Hg vacuum.

In a further embodiment, the process produces low-fat or no-fat emulsified products with a texture similar to that of full fat products. The use of high shear processing for a short period of time results in a product that does not form the protein structures that impart an undesirable texture to typical low or no-fat products. The process may be utilized without the need to add inert ingredients or water to impede formation of the protein structures. The meat emulsion produced forms a stable emulsion with optimized protein bonding to produce a desired texture.

The process may avoid formation of a visible protein exudate on whole muscle and coarse ground products. The use of high shear processing for a short period of time assists in eliminating the exudate from the surface of the meats or meat products. Additionally, the elimination of a curing period, as described herein, assists in eliminating the exudate. The protein exudate does not form when the meat mixtures are not permitted to stand for a significant period of time.

The method and apparatus, in some embodiments, utilizes a single piece of machinery for low-speed, high-volume grinding, mixing, and emulsification. The single piece of machinery may combine initial size reduction, mixing and grinding of the constituents, protein extraction, and final emulsification. Continuous processing of the constituents is enabled by such a system.

In one embodiment, the method comprises feeding a plurality of input food ingredient streams comprising one or more meat ingredient streams, measuring at least one component of at least one meat ingredient stream, and controlling relative flow rates of the input food ingredient streams based on the measurements using a feed forward analysis to maintain a percentage of at least one component in the combined stream within a predetermined range. Where two meat ingredient streams are employed, they may be differentiated by fat content, with one having a significantly higher fat content than the other. In addition to one or more meat ingredient streams, other input streams may comprise water, salt solution, spices, preservatives, and other ingredients, separately or in combination.

The control system preferably includes at least one in-line analyzer for measuring a compositional characteristic of at least one meat input stream and regulating one or more input flow rates in response to output data from the analyzer(s). The system may directly measure a compositional characteristic such as fat content, or may measure a related characteristic such as moisture content from which fat content may be estimated. The control system may include a plurality of analyzers in-line for analyzing compositional characteristics of a plurality of non-homogeneous input streams. The control system preferably operates one or more pumps or valves for each food input stream. Flow may be regulated by varying pump speed, by intermittent pump operation, by opening and closing one or more valves, by varying flow rate with one or more metering valves, or by other means. The control system thus may control both the combined flow rate and the relative flow rates of the input streams. The relative flow rates may be adjusted by the control system based on analysis of the compositional characteristics by the analyzer.

Feed forward composition analysis may enable rapid adjustment of the flow rates of the input streams to enable control of fat content, protein content, moisture content, and/or other variables of the combined stream without the need to rely on a feedback loop based on measurements of components in the combined stream. By introducing the controlled components in desired proportions at the input end, the feed forward control system may also improve processing time by eliminating delays associated with adding and mixing additional ingredients to correct deviations from desired content levels. The feed forward control system thus may enable a mixture or blend having a desired composition to be produced from ingredients introduced at the input end and flowing through the processor in a single pass, without recycling any of the output of the processor.

Another embodiment reduces the necessary number of components of meat processing equipment by providing a single, interconnected system. Materials can be placed in input hoppers or the like, and each hopper is fed via an input line to the mixer. The input rates are controlled in a steady-state manner so that the proper balance of the materials is fed to the mixer. This control is done by a system controller which receives the prescribed formulation, such as the batch sheet data or formulation rules, for a particular meat product. The system controller is then able to consider the composition of the materials in relation to the desired output composition and, using the desired formulation for a meat product from the batch sheet, control the pumps, mixer, and other devices to meet the formulation. The mixer reduces and combines the incoming materials, macerates and mixes them, and effects protein extraction for fat and water binding with the meat proteins to form a stable mixture. The mixture can then automatically be passed on for further processing. The further processing may be casing or form stuffing, and/or a cook or thermal treatment stage.

In a further embodiment, the automated and interconnected system may be utilized as part of a start-to-finish program for the production of meat products. The control system can collect and download the analysis data and the usage data for further analysis. The data can be examined to determine an actual input formulation based on the actual composition of each material or meat used in the formulation, or the system controller can perform this function and provide this information to a database. This information can be utilized to compare final product yields to input materials, and to examine the fat/meat/water ratios of meats for trends including, but not limited to, specific vendor trends. Moreover, this information can be used to provide an accurate picture of the rate of consumption of various materials, and to allow for effective and precise ordering of materials.

BRIEF DESCRIPTION OF THE DRAWINGS

FIG. 13 is a table listing configurations of rotational elements for the apparatus as described herein and data relevant thereto;

DETAILED DESCRIPTION OF PREFERRED EMBODIMENTS

Figure 1:
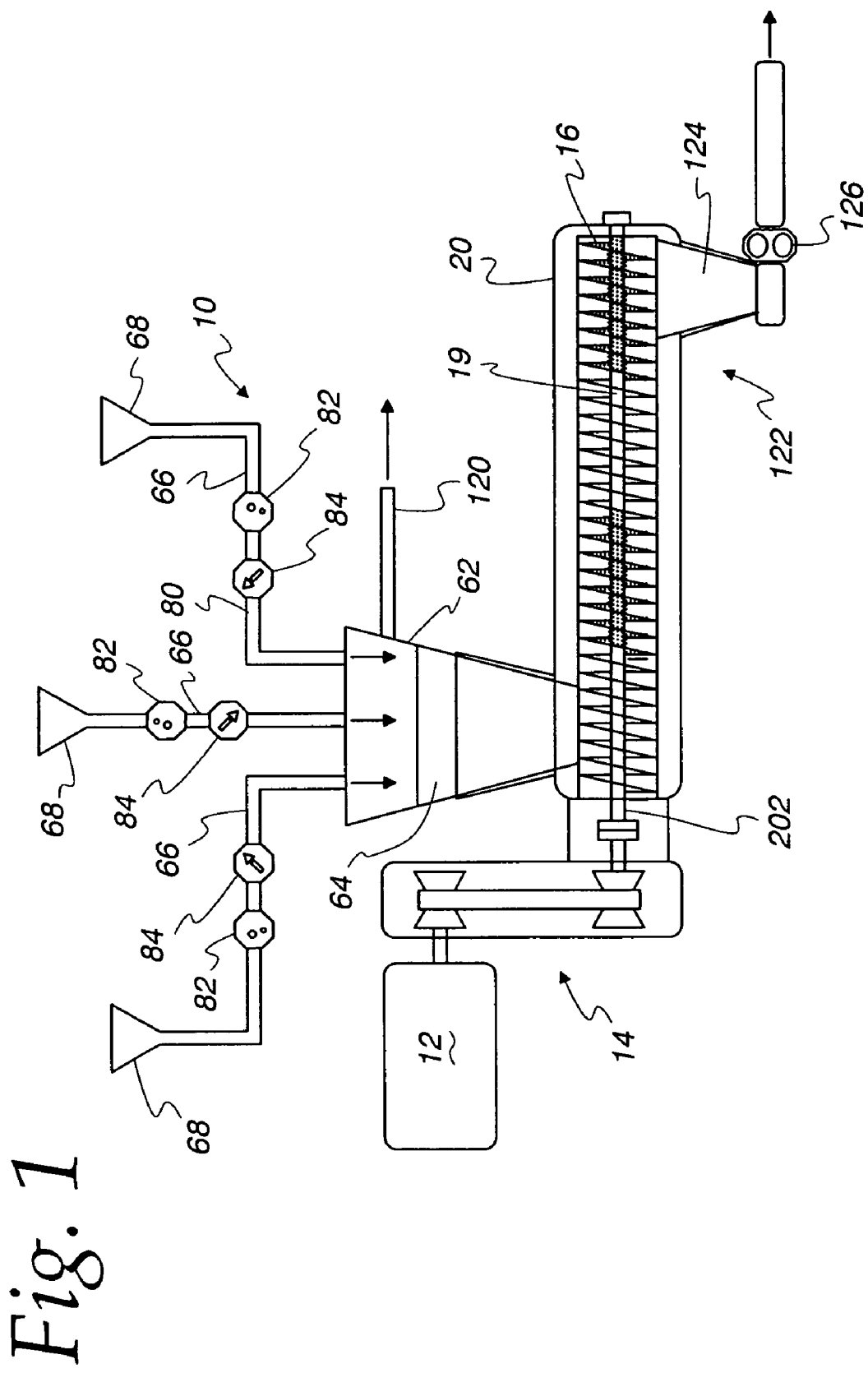
FIG. 1 is a schematic representation of a continuous mixing processor in accordance with an embodiment of the invention.

Referring initially to FIG. 1, apparatus for making processed meat products in accordance with an embodiment of the invention is shown diagrammatically at 10. The illustrated apparatus comprises a motor 12 and a belt drive 14 transmitting power to one or more mixing devices 16 located in a housing 20. Ingredients such as chunks or pieces of meat, one or more salt solutions, water, flavorings such as spices, and preservatives are input through input lines, including pumps 84, directly into the housing 20. The input line pumps 84 and mixing devices advance the mixture through the housing while the mixing device applies a high shear rate to the mixture to achieve rapid protein extraction from the meat components. The mixing devices are preferably made of stainless steel or another material that is wear resistant and suitable for contact with food product components.

Figure 2:
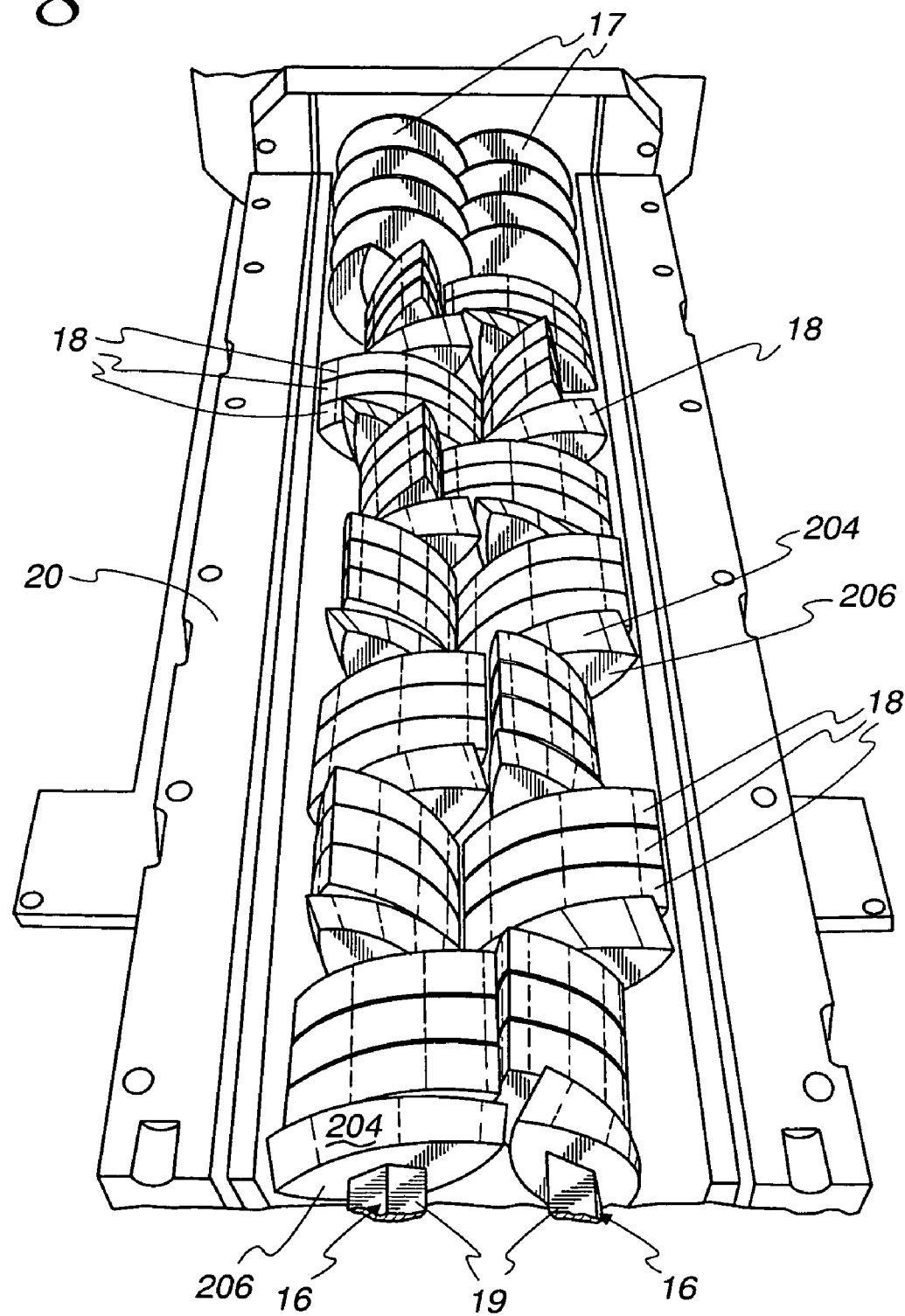
FIG. 2 is a perspective view of a mixing apparatus used in an embodiment of the invention, shown with a portion of the housing removed.

While a single elongated screw as shown in FIG. 1 may be employed as a mixing device in some embodiments, other embodiments employ other types of mixing devices. The embodiment illustrated in FIG. 2 employs a twin shaft arrangement with a relatively short infeed screw 17 used in combination with a longer array of mixing elements 18 on each shaft 19. As the ingredients are forced through the housing 20, the rotating mixing elements 18 macerate and/or mix the ingredients, and subject the ingredients to high shear force by driving them between the mixing elements 18, and between the mixing elements 18 and interior walls of the housing 20. The minimum gaps or clearances between the mixing elements 18 of one shaft 19 and the mixing elements of a second mixing device 16, as well as between the mixing elements 18 and the housing 20, are preferably between 0.06 in. and 0.12 in. In some embodiments, the gaps are 0.08 in. As the shafts rotate, the distance between mixing elements 18 on respective shafts will vary so that, for instance, whole muscle portions may be forced through without being chopped or ground. Forcing the mixture through these gaps applies high shear force and results in rapid protein extraction.

The meat, water, salt solution and other additives such as a spice slurry are simultaneously fed into the mixing device. Protein extraction herein involves an intimate contact between the salt solution and the salt-extractable proteins and breaking of the meat structure to separate protein strands, breaking the protein strands themselves, or unraveling of the proteins. The mixing device applying the high shear force mechanically provides this intimate contact, as opposed to the diffusion utilized in typical batch processes.

One mechanism for this is simply by reducing the mass transfer or diffusion distance. By reducing the meat chunks to relatively small pieces, the salt solution needs to diffuse only over a short distance, if at all. In other words, the work applied to the meat in the presence of the salt or brine solution forces the salt solution into the structure of the meat pieces. This accelerates the process, thereby promoting the necessary chemical reactions wherein chloride ions or other ions occupy bonding sites of the protein strands.

Figure 9:
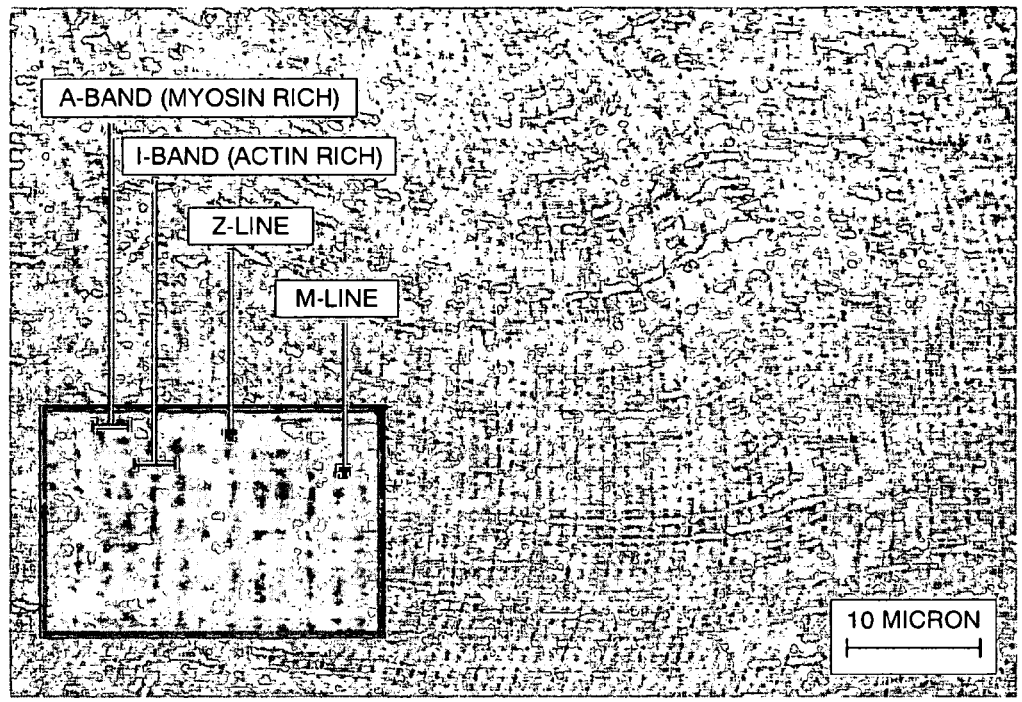
FIG. 9 is a magnified image of a piece of meat showing muscle protein striation.

Furthermore, to the degree that the protein strands remain intact, the process deforms the meat chunks, which promotes unraveling of the protein strands. FIG. 9 shows a representative unprocessed piece of meat under magnification. As can be seen, the meat shows a regular pattern of muscle protein striation, the high-density regions of protein being darker. The inset of FIG. 9 depicts a portion of the meat piece under greater magnification such that the high-protein regions can be seen distinctly separated by regions of low-protein density, or other material such as fat.

Figure 10:
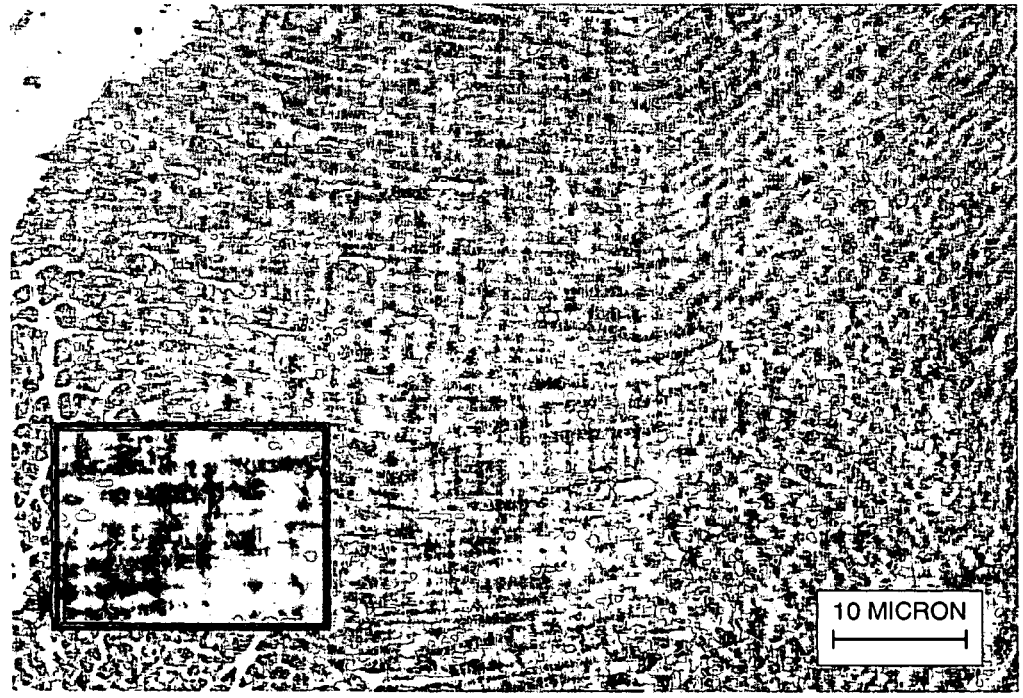
FIG. 10 is a magnified image of a piece of meat after a high shear processing step.

By applying shear force to a meat piece to deform or grind the meat, the protein strands are also deformed, flattened, stretched, and twisted. This opens up the protein structure, making them more porous, and promotes penetration of the ingredients, including the brine solution. As the dispersion is more thorough, uniform diffusion of the salt solution and other ingredients and additives, for instance, is significantly increased by use of the high shear force. Referring now to FIG. 10, a representative piece of meat that has been processed with an apparatus as described herein in the absence of other constituents or ingredients is shown. While still showing a regular pattern of striation, the meat piece has much smaller dark, high-protein-density regions, and much wider areas of lighter color. In addition, the striation pattern and the dark and light regions are less distinct, displaying a somewhat broken structure. In comparison with FIG. 9, it is clear that the application of shear force has opened up and made more porous the meat piece. Accordingly, the meat piece is more acceptable of or susceptible to diffusion of other ingredients thereinto.

This process causing rapid diffusion through the application of high shear force eliminates the need for curing, as has been described as the time for the salt solution to diffuse through the meat chunks. Because of the need for curing, typical processing methods are necessarily batch-oriented. That is, processing of certain meat products requires diffusion of salt solution into the meat for protein extraction to occur. After mixing or injection with salt solution, typical processes require a cure or diffusion time for the large meat chunks, during which time the meat is set aside to allow satisfactory diffusion. The curing stage required a significant backlog or meat inventory within the plant, which is eliminated to allow for just-in-time product usage and receipt, and reduced storage needs in the processing plant.

Figure 11:
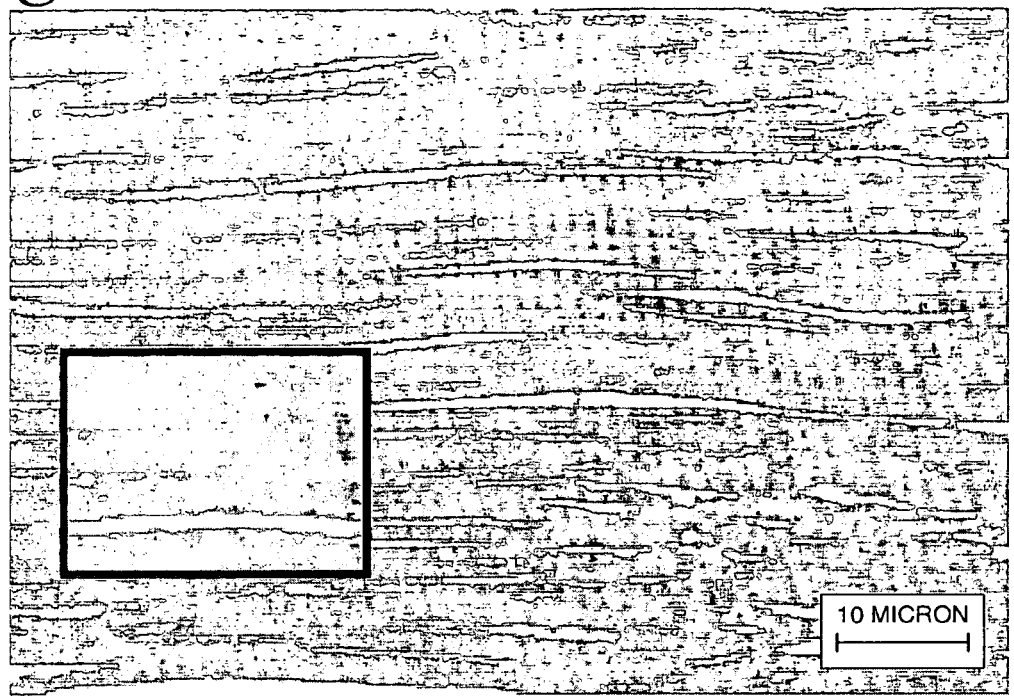
FIG. 11 is a magnified image of a piece of meat after a curing step in the presence of salt solution.

A representative piece of meat that has undergone a static batch process curing period is shown in FIG. 11. The piece of meat was injected in conventional manner for batch processing with a solution of sodium chloride (NaCl) and allowed to cure for a sufficient period typical for the meat type. By comparing the meat piece of FIG. 11 to those of FIGS. 9 and 10, the cured piece of meat shows a striation pattern and colors similar to that of FIG. 10 wherein the dark regions are reduced in size from the unprocessed piece of meat of FIG. 9, and the light regions showing opened or unraveled protein with ingredients diffused thereinto.

Figure 12:
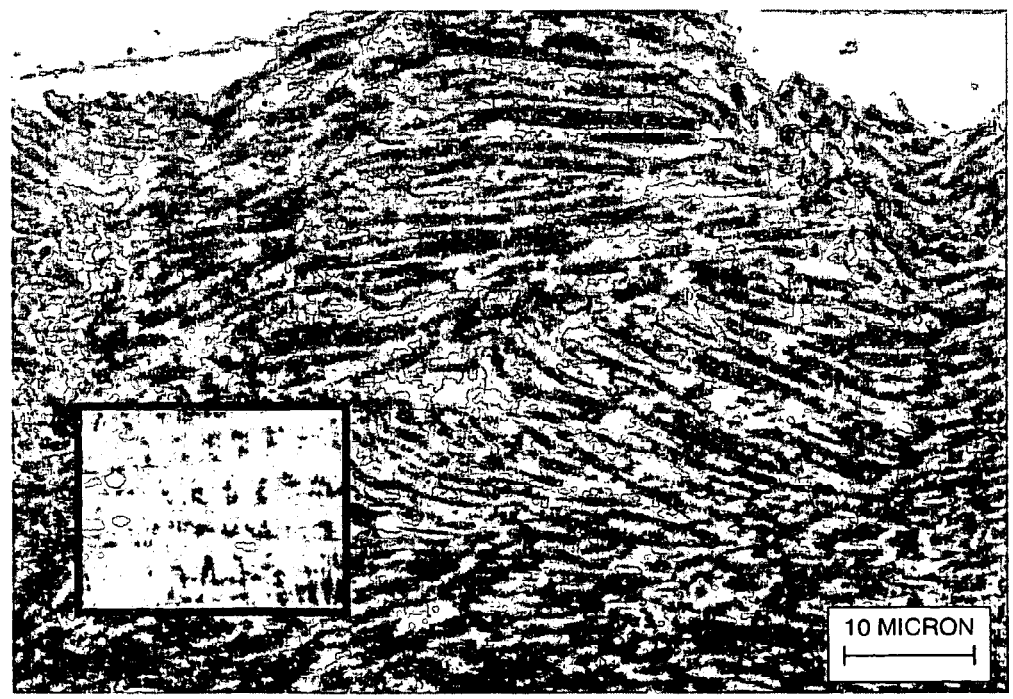
FIG. 12 is a magnified image showing a piece of meat after the high shear processing step in the presence of salt solution.

Through the application of high shear force in the presence of a salt solution, a meat piece displays a physical structure combining both the curing and the unraveling of the protein strands. FIG. 12 shows a meat piece is shown that has been processed with the apparatus in the presence of a sodium chloride solution. As can be seen, the patterns and colors are further distorted, indicating the unraveling and porosity of the protein strands, as well as the infusion and diffusion of the ingredients into and between the protein strands.

The apparatus 10 is capable of working meat ingredients and extracting protein therefrom much faster than prior art batch processes. Specifically, the processing time is reduced from a common 30-60 minutes to approximately 10-60 seconds and, preferably, 10-45 seconds. In general, this time period is related to the throughput rate. As discussed herein, the throughput rate is mostly dependent on the speed of pumps forcing the constituents or ingredients into the mixer.

Additionally, the mixing apparatus need not be used in conjunction with a vacuum environment. Though vacuum may be applied to the mixer, cooked final product made with constituents processed without an applied vacuum on the mixer does not display the visible air characteristics described above for meat that has been churned in a typical mixing vat, nor does it expand when cooked due to entrapped air. During use, the interior of the mixer is generally filled with solid and liquid constituents, and is substantially devoid of air. Little or no air is forced into the constituents. Little or no air that may be present in the mixer is mixed in with the constituents because the mixture is not whipped, and because the mixing time is short. By eliminating the vacuum system for the mixer, the process may be simplified, equipment is eliminated with a concomitant cost savings, maintenance costs may be reduced, and product loss may be reduced. It should be noted that other processing steps, such as casing stuffing, may advantageously utilize a vacuum system.

Through the effective use of high shear force applied over a small area or volume of meat, a stable protein matrix is produced. Protein extraction is rapid and easily controlled, and the protein binds the mixed water and fat molecules. The protein is then able to bind with the water and fat to form a protein/water/fat matrix. The other additives may be bound, in suspension, or dissolved therein. This effectively reduces fat and water loss to either an irrelevant level or at least to an acceptable level. Thus, the mixing device and other apparatus do not suffer from fat being left in the equipment. The composition of the final product is more easily controlled without significant fat or water being lost. The texture of the final product is desirable. Testing methods, such as the Ronge Method utilizing a centrifuge to measure quantities of fat escaping from the mixture, will show that the stability of a mixture made by this method is equal to or exceeds the stability of conventional batch processed mixtures.

This system also controls protein matrix formation in emulsified products referred to as fat-free products having 1% or less fat, an example being bologna. These products are typically a meat/additive blend with water. In typical formulation, the blend lacks the fat which otherwise tends to break up the protein matrix. Proteins are able to form strong gel-like structures with long, cross-linked protein strands forming a large matrix, as has been mentioned. This results in a rubbery texture that is undesirable to consumers who expect a texture similar to that of full fat meat products.

Typically, this protein matrix problem in the fat-free products is dealt with by addition or selection of ingredients, though so-called fillers are generally not permitted. One method for breaking up the matrix formation is to add inert additives such as starch or non-functional proteins for instance. Though water binds with the protein to retard matrix formation, excessive water results in a soft product that does not hold together well, and that may allow excessive amounts of water to leech out. Furthermore, water may be driven off during the cook and post-cook stages.

Fat-free products, it is believed, suffer from this problem largely because of the mixing times of conventional batch processes. It is believed that batch processing requires such extensive mixing times that this excessive protein linking is able to occur, and the matrix structures begin to form during this mixing time. Analysis of final cooked product using the present method and apparatus has demonstrated that there is a marked disruption in the matrix structure. It is further believed that the high shear of the present method and apparatus prevents or interferes with the ability of the proteins to link as such, and/or the stark reduction in mixing time of the present method and apparatus reduces or eliminates the ability for the proteins to form these long matrix links. In any event, bologna and other so-called no-fat or fat-free products produced using this method do not require any inert additives to reduce or avoid the large matrix formation while still producing a product with the desired texture characteristics of a full fat meat product.

For whole muscle and coarse ground products, another benefit of the present apparatus and method is the elimination of the commonly-known visible protein exudate that forms on the surface of the meats. More specifically, in certain batch processors, a combination of protein, salt solution, and water forms protein exudate, a sticky and viscous material, as the meats sit in the curing vat for the batch processing. This must be broken up prior to further processing steps, such as delivering through pumps. Because the present system utilizes continuous processing, this exudate does not have the opportunity to form.

It is believed that the protein exudate results from lengthy mixing time periods. That is, as a time period must elapse for the entirety of the constituents to have sufficient protein extraction, some portions of the constituents will allow excess protein to be extracted. By reducing and controlling the amount of protein extraction throughout the constituents, the exudate is reduced or eliminated. As the mixture discharged from the mixer is delivered relatively quickly to further processing, such as casing stuffing or thermal processing, the mixture does not continue to cure and extract additional proteins. In other words, the residence time within the mixer is less than is required for the formation of a visible protein exudate to form, and the protein extraction substantially ceases once discharged from the mixer. Though it has been suggested that the exudate is actually responsible for bonding of the meat product, elimination of the exudate has shown no deleterious effect on the final product created as described herein.

In some cases, it may be desirable to control the temperature of the mixer housing. For instance, it is believed that cooling the mixer housing is beneficial in forming coarse ground items. It is also believed that the internal temperature of the mixture during the mixing process optimally remains below a threshold level, or a maximum rise in internal temperature during processing. As it has been found that increased shear work in the mixer improves mixture stability, reducing the temperature of the mixture by cooling the mixer housing or inputting ingredients (such as cool water) at points along the length of the mixer may allow the residence time to increase, or allow the RPMs of the mixing elements to increase. More specifically, cooling the mixture may allow increased shear work while maintaining the temperature of the mixture below the threshold level.

It should be noted that varying the size of the outlet, in the form of a discharge gate opening, necessarily affects residence time for the mixture within the mixer. The opening may be in the range of ⅛ inch to two inches.

One example of a commercially available mixer such as that described is a Twin Shaft Continuous Processor manufactured by Readco Manufacturing, Inc., of York, Pa., having 5" diameter mixing elements 18 on counterrotating shafts 19, and throughput of about 6,000 lbs./hr. at about 200 rpm. In operation, the shafts may have adjustable speeds. Satisfactory operation of the system may be achieved with rotational velocities of, e.g., 100-600 RPM. For the present system, the rate of rotation determines the amount of work, including shearing, applied to the mixture. To drive the mixture through, the mixing elements 18 and/or the system pumps for inputting the constituents may be used. It should be noted that any pumping force is not what would be termed "high pressure" such that the structural integrity of the pumps, pipes, and other components are generally not in danger of failure. The pressure does not force the fat to separate from the mixture. In other embodiments, larger or smaller mixers may be used, e.g., 8 in. diameter mixers having throughput of at least 20,000 lbs/hr, and up to about 25,000 lbs./hr. The output may vary depending on the downstream processes, such as casing or form stuffing or cooking. Typically, the thermal processes of cooking or chilling determine the actual mixing device output rate than can be handled downstream.

As shown in FIGS. 2-5, each of the illustrated mixing elements 18 has a bore 200 through which a shaft may pass. To couple each mixing element to the shaft for rotation therewith, each mixing element has a noncircular bore therethrough and the shaft has a cross section of the same shape. In the illustrated embodiment, each mixing element has a generally square bore, and the shaft accordingly has a square cross section. More specifically, mixing element 18a (FIG. 3) has a square hole where two corners of the square are aligned with the points of the mixing element 18a itself. In contrast, mixing element 18b (FIG. 4) has a square hole where two sides are aligned with the mixing element points. The mixing element 18a is referred to as a "diamond" mixing element, while the mixing element 18b is referred to as a "square" mixing element. Thus, the bore in one mixing element may be rotated 45 degrees from a second mixing element that is otherwise identical.

Figures 20, 21:
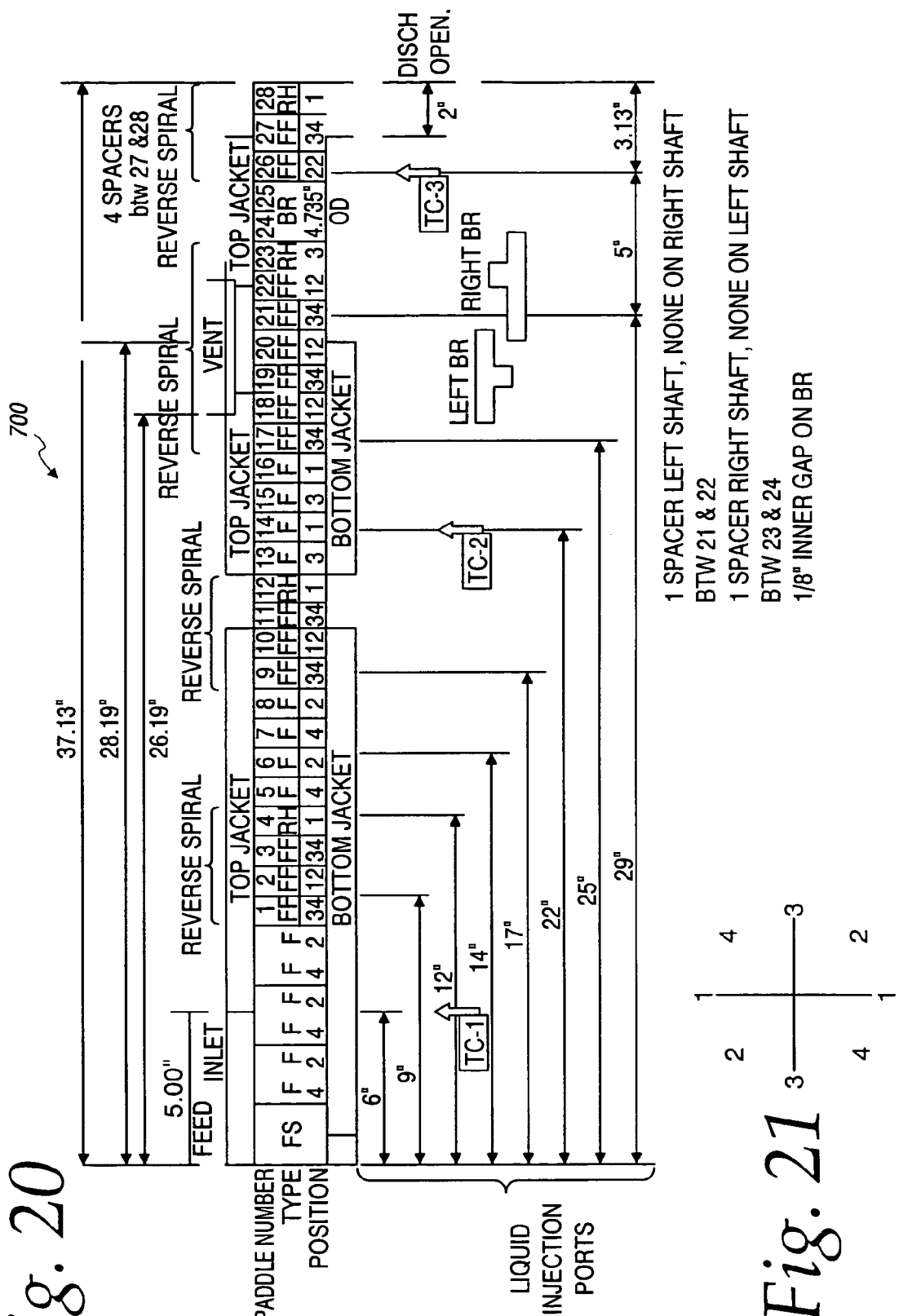
FIG. 21 is a graphical coordinate representation showing orientations of components within the apparatus.

As can be seen in FIG. 21, the mixing elements 18a, 18b can thus be oriented around the shaft with essentially four different initial positions or orientations when viewed from the output end of the mixer. A first orientation aligns the points of the mixing element through the vertically aligned positions labeled as "1." A second orientation aligns the points with the positions labeled "2," 45 degrees counterclockwise from the first orientation, while the forth orientation aligns the points with the positions labeled "4," 45 degrees clockwise from the first orientation. The third orientation aligns the points through generally horizontal positions labeled as "3." However, it should be noted that the initial positions of the elements on the shaft may vary infinitely as desired around the axis of the shaft.

As described, the mixing elements may be placed in different rotational orientations and different orders, i.e., configurations to vary shear rate, throughput rate, and/or other process parameters. The mixing elements may also be interchanged with mixing elements of different configurations. In other embodiments, to facilitate cleaning and sterilization of the apparatus, the mixing elements may be formed integrally with the shaft as a one-piece, unitary rotor, or may be otherwise supported for rotation therewith.

Figure 3:
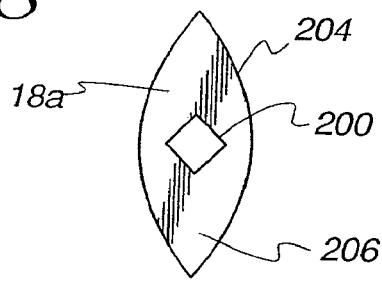
FIG. 3 is a front elevation view of a component of the apparatus of FIG. 2.
Figure 4:
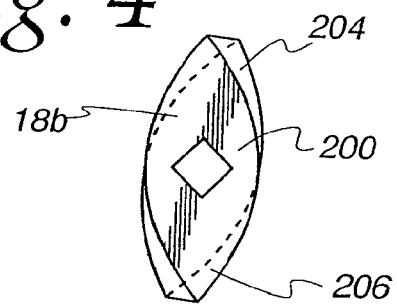
FIG. 4 is a front elevation view of another component of the apparatus of FIG. 2.
Figure 5:
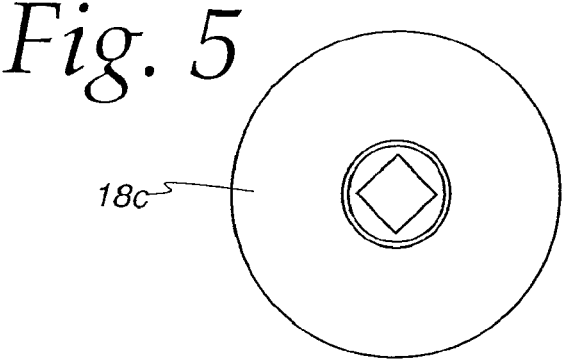
FIG. 5 is a front elevation view of another component of the apparatus of FIG. 2.

In the illustrated embodiments, mixing element 18a (FIG. 3) and mixing element 18b (FIG. 4) have a generally ovate profile shaped similar to that of an American football, with a point or very small radius of curvature at each end. The illustrated mixing elements 18a, 18b have flat, parallel faces 206 and arcuate peripheral edge surfaces 204. As illustrated in FIG. 3, the mixing elements 18a have the edge surface 204 perpendicular to the faces. For the mixing elements 18b, illustrated in FIG. 4, the edge surface 204 is angled relative to the faces, and the faces are angularly offset slightly relative to each other, so that rotation of the mixing elements provides a forward or reverse motion in pumping the mixture through the housing. One or more of the mixing elements 18b may be provided to assist the screws 17 in pumping the mixture forward through the housing. Alternatively, one or more of the mixing elements 18b may be reversed so as to urge the mixture rearward. This may create regions of increased flow resistance or reverse flow so that the dwell or mix time for the mixture or for particular portions of the mixture is increased, and the work imparted by the mixing device is increased. An additional mixing element 18c is illustrated in FIG. 5. This mixing element 18c has a generally circular or disc-like shape. Each mixing element 18a and 18b may have a width of ½ inch to 1 inch, and the mixing element 18c may have a width of 1 to 2 inches. Spacers may also be placed between each element.

On each shaft 19, each of the mixing elements 18 has a wiping action relative to one or more mixing elements on the opposite shaft to avoid build up of ingredients on the mixing elements. This self-cleaning characteristic helps to maintain flow of the ingredients through the mixer, and helps in maintaining good distribution of the ingredients. Shaft 19 is preferably a one piece unitary item that may be removed from the housing 20.

A modified screw element 30 that may be used in conjunction with or instead of one or both of the screw elements 17 and mixing elements 18 described above is shown in FIG. 6. The screw element 30 has a helical outer edge 34 disposed at a predetermined radius from the axis of the screw, and spaced from the interior of the housing by a narrow gap of, e.g., about 0.08 in. On the face 32 of the screw are provided a plurality of sharp-edged protrusions or blocks 40 for puncturing whole muscle meat components of the mixture to facilitate protein extraction. Each of the illustrated protrusions 40 has five exposed faces. Each of the illustrated protrusions comprises two pair of generally parallel quadrilateral side faces 41 and a quadrilateral end face 43. The end faces are rectangular, and in particular, square, and are perpendicular to the side faces. The end faces and side faces are substantially planar.

The arrangement of the mixing elements may be constructed in different manners for different amounts of dwell time, as well as for different amounts and types of work to be applied. For instance, an initial section may be spiral fluted or screw elements which may be used for pumping through the housing. The screw elements may also be used to provide some initial size reduction of the incoming meat chunks, for instance, reducing the size from a piece that measures as large as several pounds to pieces measured in a few ounces or less. This may be achieved by, for instance, the edges of the flutes providing a cutting or tearing edge, and/or from the faces of the flutes being provided with surface features for achieving the same, similar to that described herein for the element 30. As the mixture passes through the mixing elements 18, a first group of mixing elements may be arranged to provide a first level of shear force application that is primarily for mixing or for allowing the described reactions to occur between the protein and salt solution, as examples. Then, the mixture may pass through a second group of mixing elements imparting a second, higher level of shear force application for the purposes described herein. There may be a further grouping for applying a shear force lower than the second level for additional mixing, followed by a final group of mixing elements for final high shear application, such as for final size reduction or comminution.

The utilization of the mixing device in this manner allows for continuous processing, as the mixture forms a stable mixture that is output at one end as new material to be processed enters at the input. Pre-input hoppers including one or more grinders may be used for feeding the meat input lines and for some amount of meat chunk size reduction to facilitate the pumping of the meat into the mixing device. In this manner, meats and other constituents may be simultaneously fed into a continuous processor so that size reduction, mixing, grinding, protein extraction, and emulsification may all occur continuously and in a single piece of equipment. Thus, the amount of equipment is reduced, the floor space required for that equipment is reduced, sanitation is simplified for the equipment, and the opportunity for contamination of the mixture is reduced.

The configuration of the rotating mixing elements such as the mixing elements may be adjusted depending on the type of product being mixed or being produced. For instance, finely chopped products resulting in a smooth and fine batter, such as bologna, may be produced. More coarsely chopped products such as salami may also be produced. In addition, whole muscle products such as turkey or ham may be processed.

Figure 15:
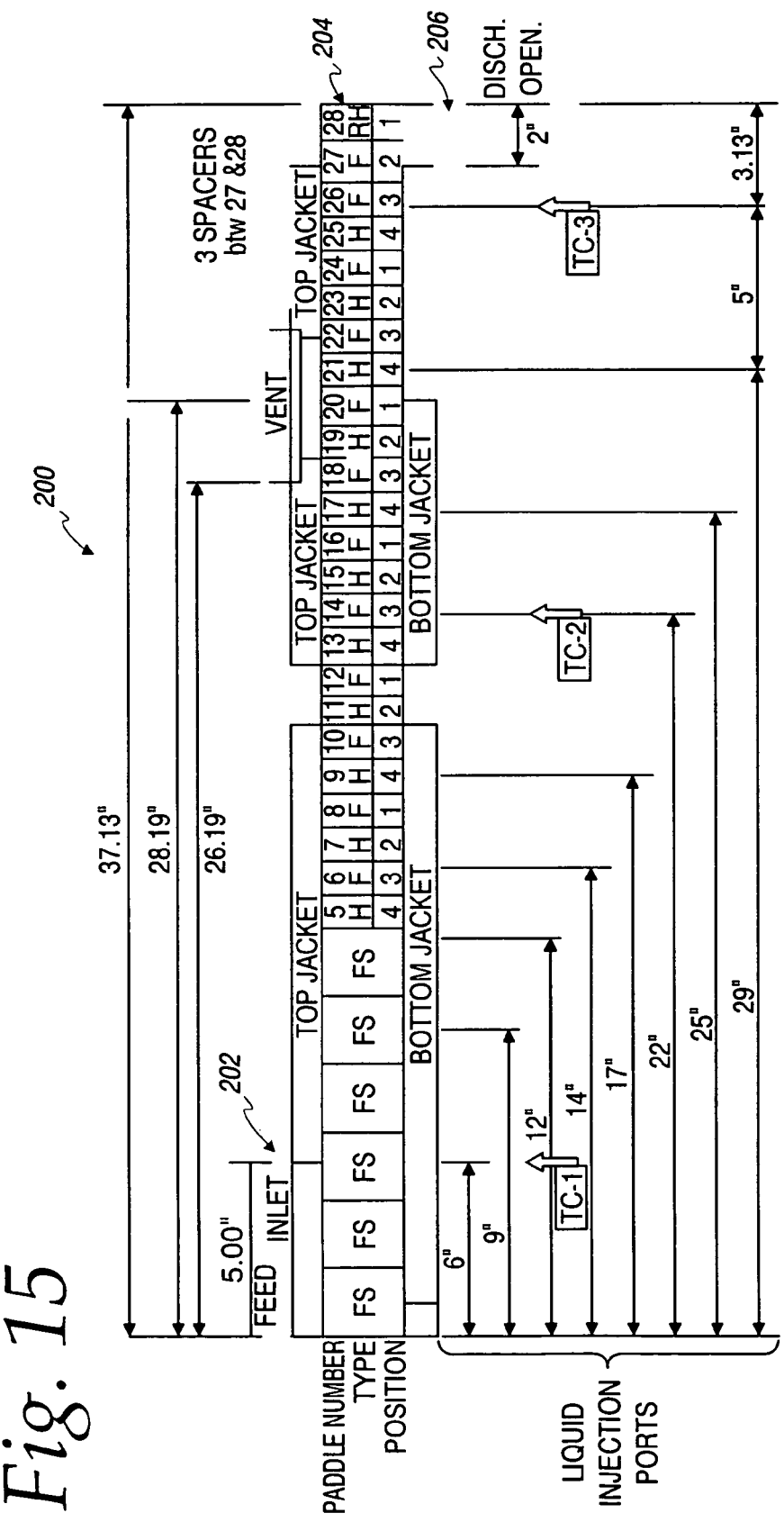
FIGS. 15-20 are schematic representations of the configurations of FIG. 13.

FIGS. 15-20 show a series of configurations for arranged elements on shafts within the mixer housing. In FIG. 15, a mixer 200 is depicted having infeed screws FS arranged at an input end 202 of the mixer 200 and providing a mixing zone. Along a first shaft two series of mixing elements F, discussed earlier as flat mixing elements 18a, and mixing elements H, discussed earlier as helical mixing elements 18b, are arranged for providing a shear application zone. A second shaft (not shown) would be positioned parallel to the first shaft and carry screws FS and mixing elements H, F, the selection of which corresponds to those on the first shaft. As depicted, the mixing elements H and F are provided a first number 5-28 to indicate their position in the series, and the orientation of each mixing element H, F is designated by a second number corresponding to relative positions shown in FIG. 21. As shown, liquid injection ports may be provided along the length of the mixer for providing liquid streams therein. As discussed above, the infeed screws FS are primarily low-shear elements for forcing the constituents through the mixer 200, while the mixing elements H, F are high-shear elements for applying work to constituents within the mixer 200. In this configuration, each shaft has six feed screws FS, eleven helical mixing elements H, and twelve flat mixing elements F. A reverse helical mixing element RH is provided proximate the outlet to force the mixture away from an outlet wall 204 proximate a mixer outlet 206.

Figure 16:
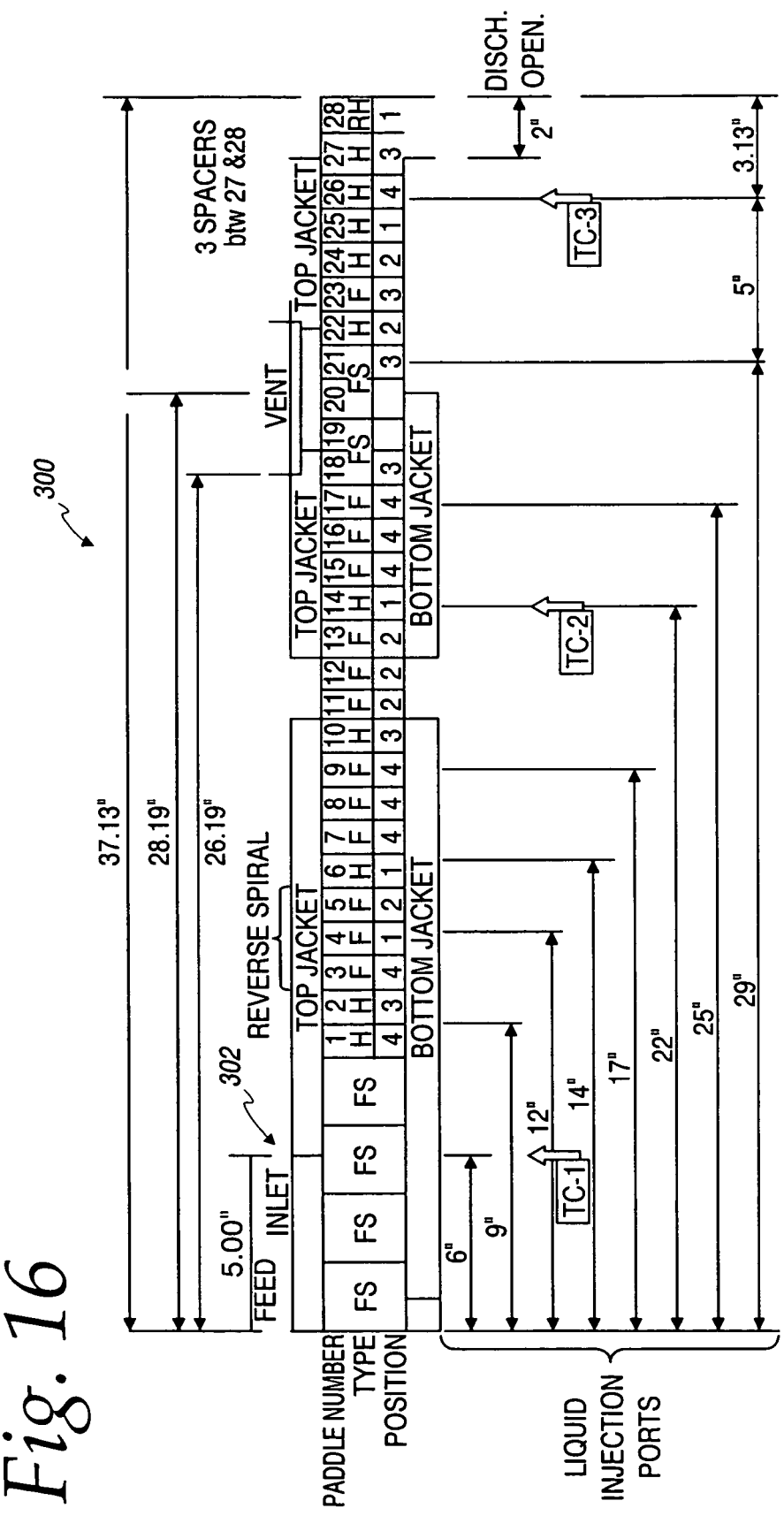

FIG. 16 shows a mixer 300 similar to that of the mixer 200. However, the mixer 300 shows a second series of screws FS downstream from a series of screws FS at an input end 302. In this manner, the mixer 300 provides two mixing zones corresponding to the screws FS, and provides two shear application zones. In addition, this configuration provides each shaft with six feed screws FS, ten helical mixing elements H, and thirteen flat mixing elements F. The helical mixing elements H promote the movement of the mixture through the mixer 300, as discussed above. By reducing the number of helical mixing elements H in the mixer 300 in comparison to the number in the mixer 200, the shear force applied in the configuration of mixer 300 is higher.

Figure 17:
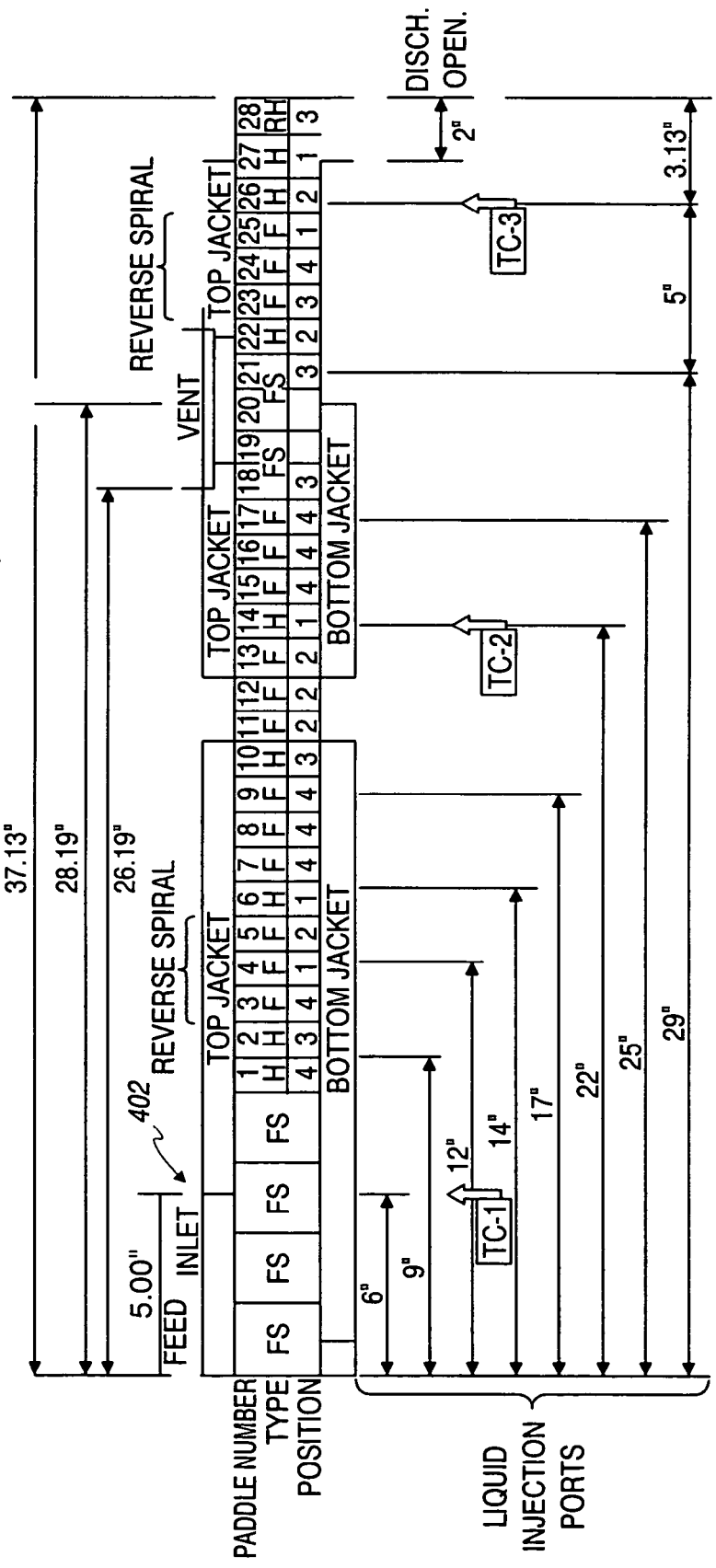

FIG. 17 shows a mixer 400 having two mixing zones, provided by the feed screws FS, and two shear application zones. The mixer 400 includes eight helical mixing elements H, and fifteen flat mixing elements F. Again, with a reduction in the number of helical mixing elements H in comparison to the mixers 200 and 300, the shear force applied in this configuration is increased.

Figure 18:
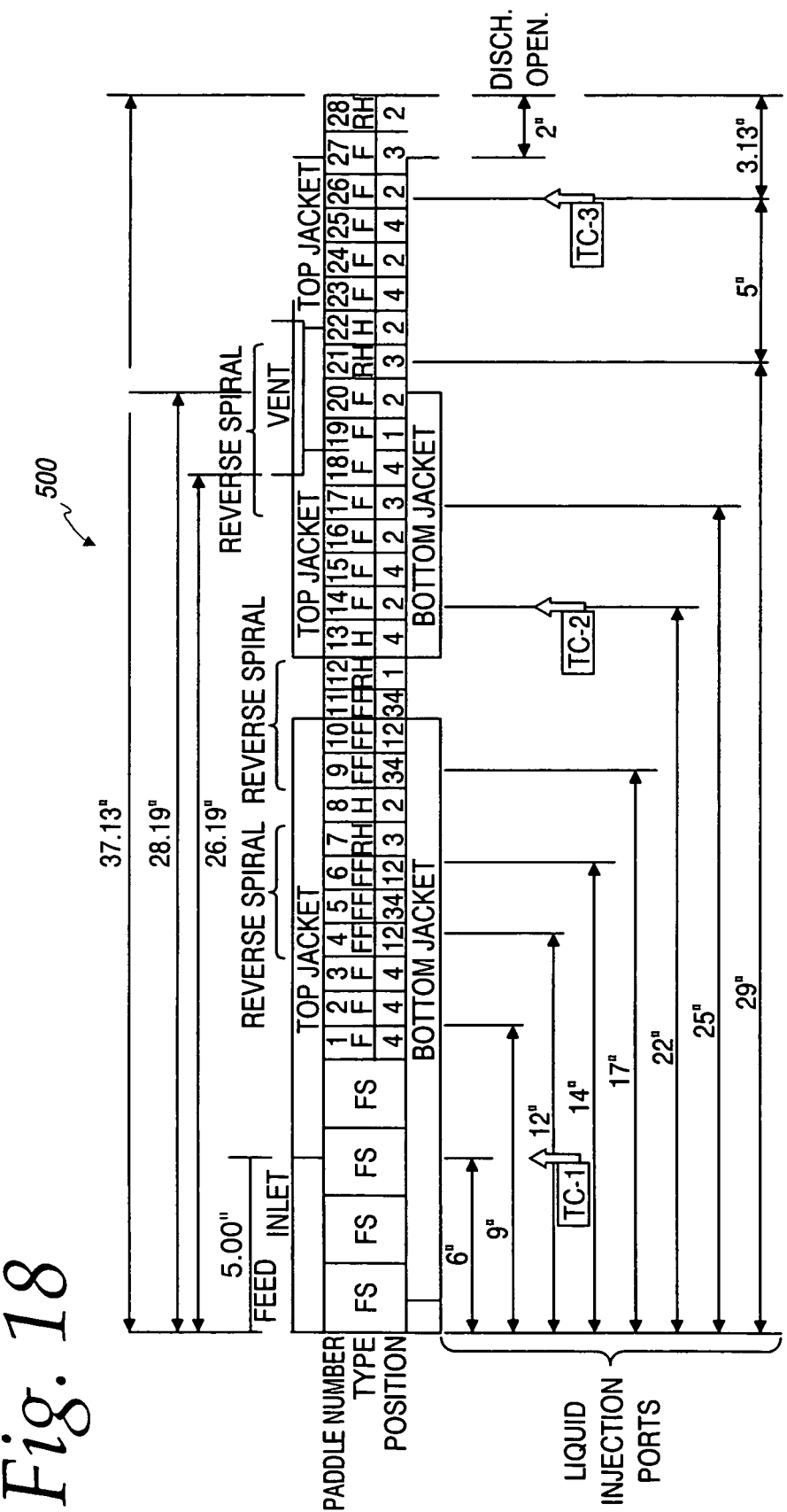

FIG. 18 shows a mixer 500 having a single mixing zone proximate the inlet 502, while the rest of the mixer applies shear force. In this configuration, elements numbered 4-6 and 9-11 are paired half-sized flat mixing elements F, where each of the pair is rotated 45 degrees from those mixing elements immediately adjacent thereto. This series allows more work, and thus more shear force, to be imparted to the mixture as it moves through such a region. Furthermore, three additional reverse helical mixing elements RH are provided. As the helical mixing elements H promote the mixture moving through the mixer, the reverse helical mixing elements RH retard this movement and provide a backward force to the mixture. This action alone increases the work applied in comparison to flat or helical mixing elements, but also increases residence time, thereby further increasing the applied work and shear force applied to the mixture. The number of feed screws FS is reduced to four, thereby allowing more high-shear elements to be placed on the shaft. This configuration utilizes only three helical mixing elements H, and 15 flat mixing elements F, in addition to the half-sized mixing elements and reverse helical mixing elements RH.

Figure 19:
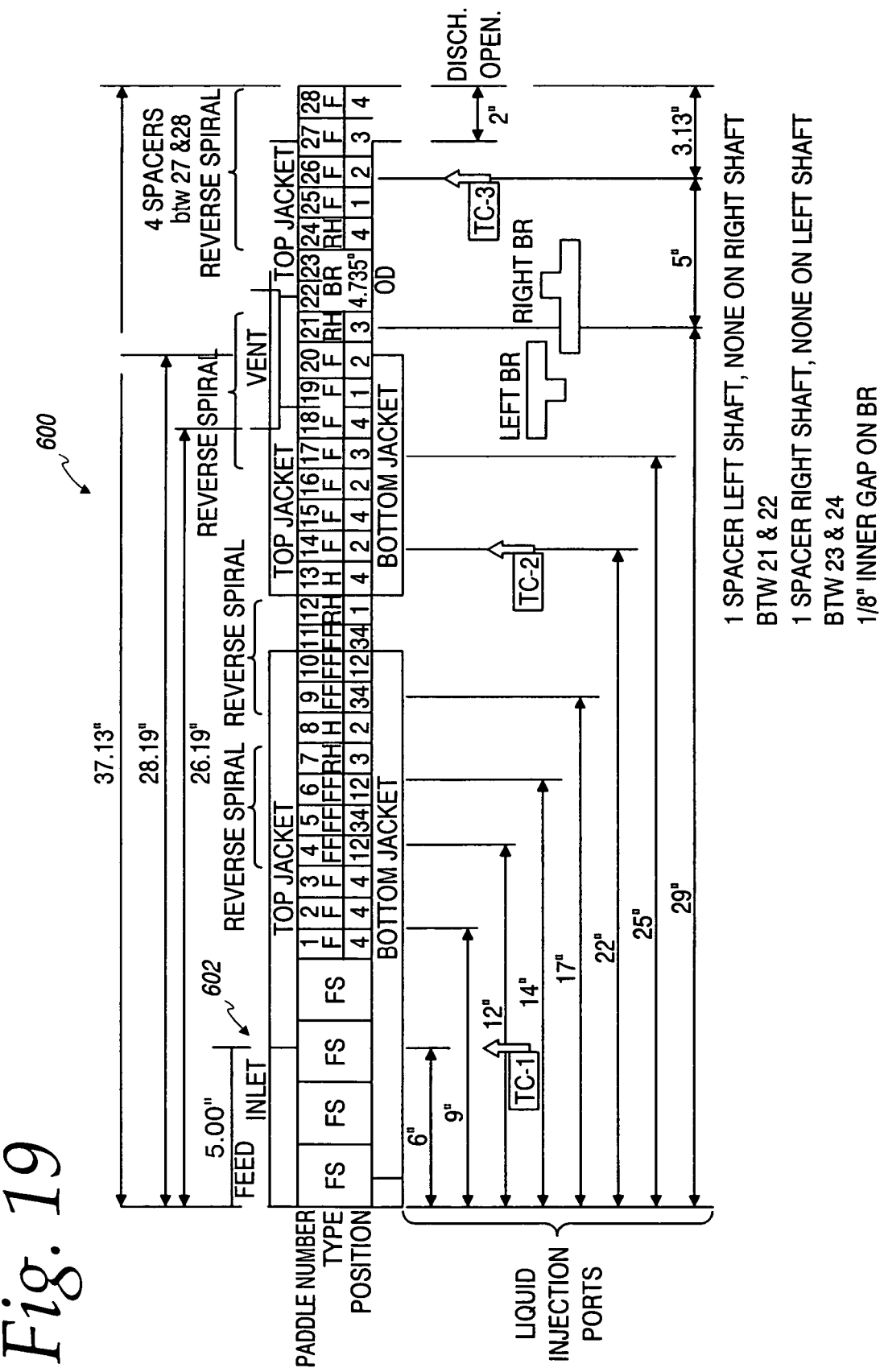

An even greater amount of shear force application is achieved with the configuration of FIG. 19. A mixer 600 is provided similar to that of the mixer 500. However, a blister ring BR is provided, discussed earlier as mixing element 18c. In order to accommodate the blister ring BR, there are only fourteen flat mixing elements F and two helical mixing elements H. The blister ring BR applies more shear than any of the helical, flat, or reverse helical mixing elements.

FIG. 20 shows an even higher level of shear force application. For a mixer 700 depicted in FIG. 20, the helical mixing elements H have been removed, and a total of 4 reverse helical elements are provided. In comparison to each of the previous configurations depicted in FIGS. 15-19, the mixer 700 provides an even greater amount of shear force and work to the mixture.

Testing was performed to determine emulsion stability of various mixtures utilizing a product formula for beef franks. When the mixture leaves the mixer, whether batch processor or an apparatus as described herein, the mixture will be processed by other machinery and forces. Accordingly, the mixture must not lose stability during this downstream processing. As noted above, an emulsion is considered stable if it loses less than 2% of the final product due to fat cook-out during cooking. With reference to the table of FIG. 13, test results for a number of conditions corresponding to the configurations of FIGS. 15-20 are presented, and conditions 5 and 16 represent control batches made from a conventional batch mixing system. The testing was done such that mixture produced from each condition was placed in a separate piece of machinery that applied a shear force many times greater than the shear force of the apparatus as described herein. After every minute of the additional shear being applied, a sample was removed and cooked.

Figure 14:
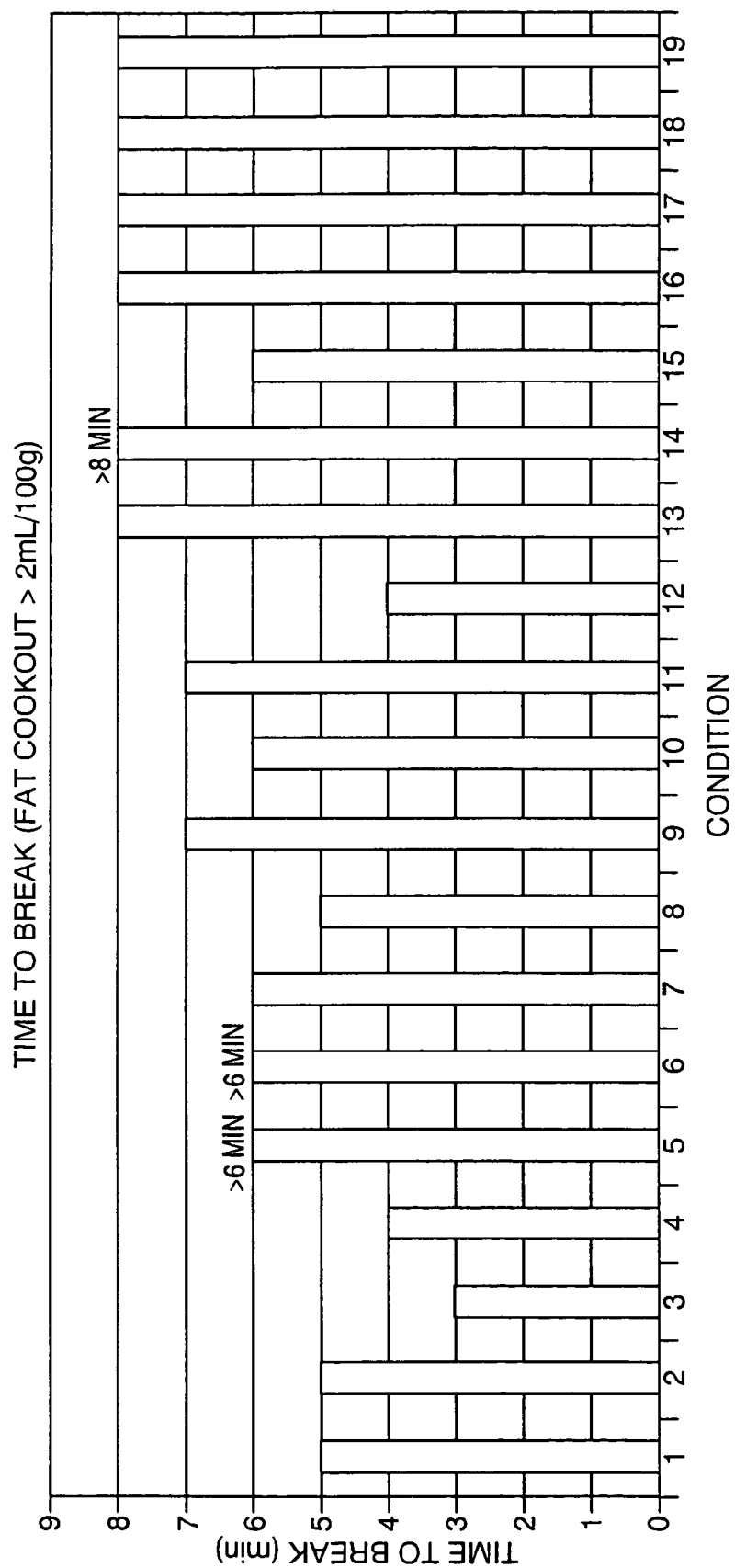
FIG. 14 is a graphical representation of a measure of emulsion stability for the configurations of FIG. 13.

It is generally considered that an emulsion is sufficiently stable if three minutes of additional shear do not result in the emulsion having cookout greater than 2% of the product, by weight, lost due to fat cook-out. The testing determined that the control mixtures withstood additional shear force for approximately 6-8 minutes before the additional work resulted in excessive fat and water cookout, and was unstable at greater time periods. As can be seen in FIG. 13, each of the other conditions resulted in a mixture that withstood at least three minutes of additional shear force application. For the mixers 500, 600 and 700, the emulsion stability was comparable or better than the emulsion stability of the batch processed mixture. The point at which the additional shear force application causes the emulsion to lose stability is referred to as Time to Break, and the results of this testing are presented graphically in FIG. 14 to show the Time to Break for each condition. It should also be noted that no significant differences were noted in the final appearance for the cooked product resulting from each condition.

The ingredients are preferably pumped through the input lines into the mixer, though an inlet hopper 62 may alternatively also be employed, as is shown in FIG. 1. As noted earlier, pre-input hoppers 68 may be provided as storage into which plant personnel load a quantity of materials. In addition, a grinder or pre-blending device 64 may be provided prior to or within the hopper 62 to provide an initial mixing, grinding, or blending action, and/or to assist in pumping the input streams downward through the hopper.

Ingredients are supplied as input streams by a plurality of input assemblies 66. The input streams may include a first stream comprising predominantly lean meat or muscle content, a second stream comprising predominantly fat content, a third stream comprising one or more salt solutions such as sodium chloride dissolved in water as well as any spices or flavorings, a fourth stream comprising an aqueous nitrite solution, and a fifth stream consisting essentially of water. Additional ingredients including flavorings such as spices, preservatives, and/or other ingredients may be introduced in additional streams, or may be incorporated in one of the five streams described above. Some meat products may utilize more than two meats, and in some of these instances the system may include additional input assemblies. In other cases, some meat products require small amounts (relative to the overall mixture, such as in the range of 2-5%) of a plurality of particular meats, and these may be pre-mixed and delivered to the mixer with a single input for metering them in at the relatively low rate. Each input line may be provided with the hopper 68 or tank which may hold a pre-mixed quantity of its respective constituent. For instance, a relatively low rate of nitrite solution is used, so a single, pre-mixed quantity in a vat metered through an input line is sufficient for the continuous processing. A left-over-batter line may also be provided to return batter to the mixer for reworking.

In the embodiment of FIG. 1, each of the input assemblies 66 includes a feed line 80 for carrying an ingredient to the inlet hopper 62, a content analyzer 82 on the feed line, and a metering pump 84 or valve downstream from the analyzer on the feed line. In other embodiments, e.g., the embodiment of FIG. 7, content analyzers are employed on some but not all of the input assemblies.

As an ingredient stream passes through an associated content analyzer 82, the stream is analyzed to determine, for example, fat, moisture and/or protein content. In order to achieve balance between the various ingredients in the desired ratio, a control system receives input from a plurality of analyzers, and regulates the throughput rates of the metering pumps 84 so that the ingredients flow into the inlet hopper 62 in the desired ratio, as specified by the product formula.

Various methods may be used for analyzing the fat, moisture, and protein content. Known methods include use of microwave energy or infrared light. Commercially available in-line analyzers may be programmed to analyze characteristics of a wide variety of substances ranging from, e.g., petrochemicals to processed cheese. Examples of such analyzers include in-line analyzers GMS #44 and GMS #46 manufactured by Weiler and Company, Inc., of Whitewater, Wis., and the Process Quantifier manufactured by ESE Inc. of Marshfield, Wis. These analyzers typically must be calibrated for each individual application, either by the manufacturer or by the end user.

Figure 7:
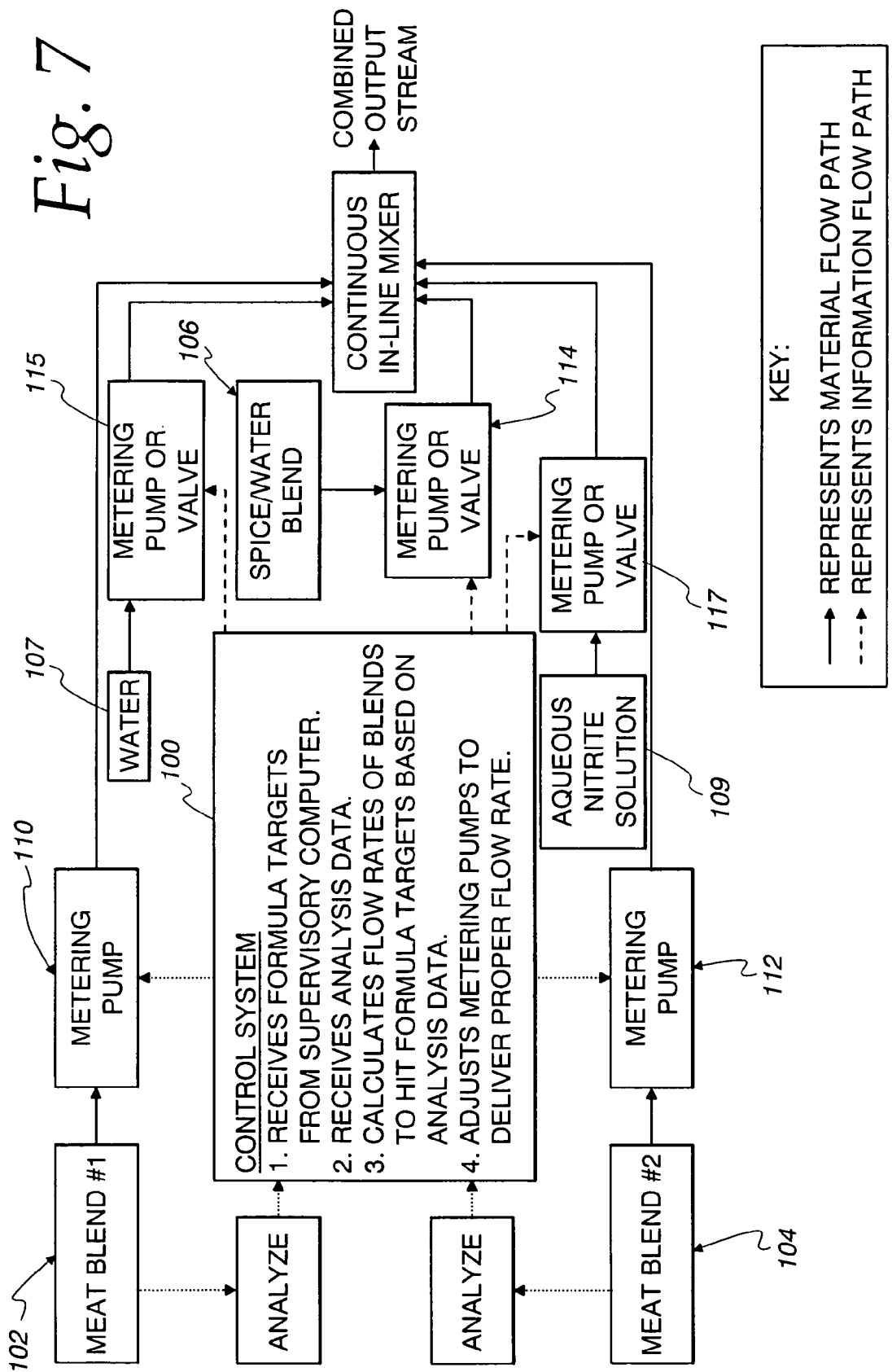
FIG. 7 is a flow diagram representing a process in accordance with an embodiment of the invention.
Figure 8:
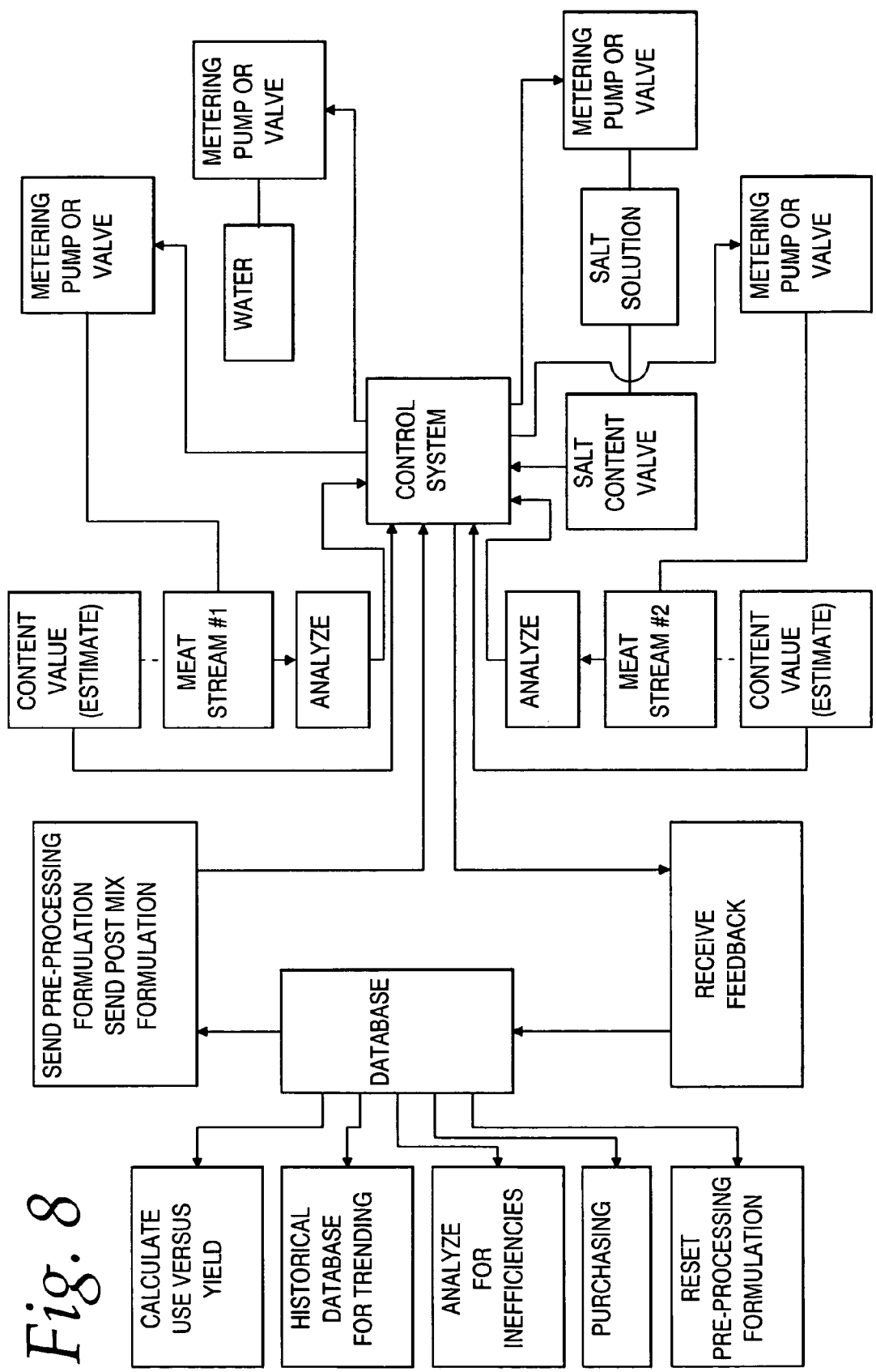
FIG. 8 is a flow diagram representing a process in accordance with an embodiment of the invention.

FIG. 7 illustrates a process embodying the invention comprising a control system 100 balancing flow rates of a plurality of input streams to maintain compositional parameters within desired ranges using a feed forward analysis. In the process of FIG. 7, there are two meat input streams 102 and 104. In other embodiments, the process may employ only one meat input stream, or three or more meat input streams.

The process preferably employs one or more additional input streams to supply moisture, flavor enhancers, preservatives, and/or other ingredients. In the process of FIG. 7, there are three non-meat input streams comprising a spice/water blend input stream 106, a water input stream 107, and an aqueous nitrite solution input stream 109. Other embodiments may employ more or fewer non-meat input streams.

Figure 6:
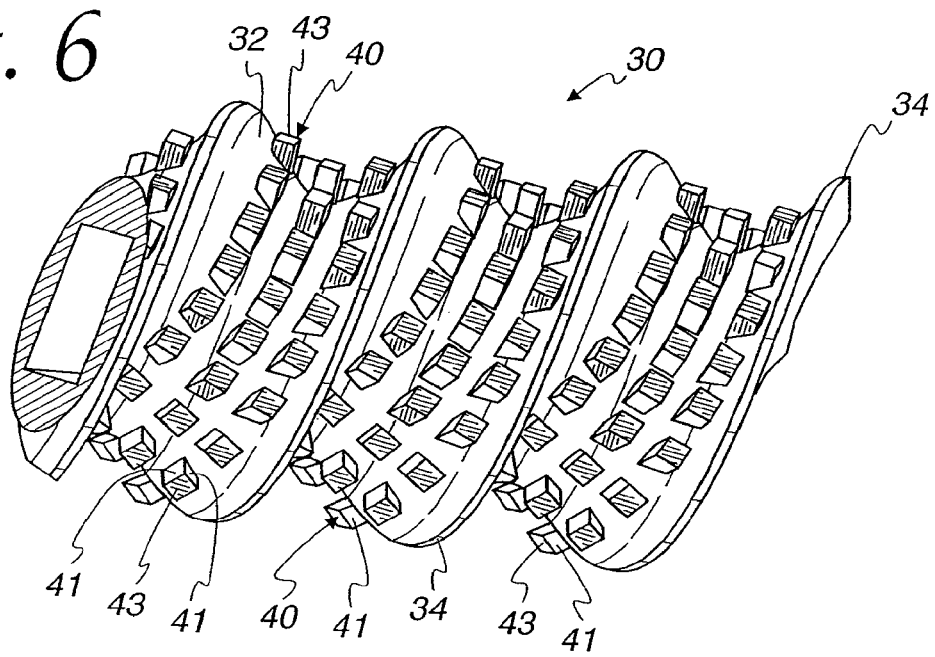
FIG. 6 is a fragmentary side view of a segment of a rotational element in accordance with an embodiment of the invention.

To produce a mixture with desired moisture, protein and fat content levels, the control system 100 regulates the flow rates of the input streams by adjusting the speed of a pump or valve associated with each input stream. In the embodiment of FIG. 6, metering pumps 110 and 112 regulate flow rates of the meat blend input streams, and additional pumps or valves 114, 115 and 117 are employed to regulate the flow rates of the other input streams.

Adjustments are made using a feed-forward method whereby the pumps and valves provide the proper relative amounts of the input streams based on upstream analysis. To determine the need for adjustments to the various flow rates, the control system 100 utilizes the content analyzers 82 to determine the protein, fat and/or moisture content levels of ingredient input streams 102, 104 upstream of the metering pumps 110 and 112. In some embodiments, for each input stream element that is analyzed, analysis is completed before the element reaches the metering pump associated with the input stream so that the flow rate of the associated input stream may be adjusted as needed to maintain the desired compositional parameters of the combined output stream continuously within the target range. In other embodiments, analysis may take place after the element has passed through the metering pump, and flow rates may be adjusted as necessary to account for the delay. Thus, the percentages of protein, moisture and fat entering the mixer are preferably regulated so that adjustments to variations in input stream characteristics are made as the input streams flow into the hopper, rather than being made in response to characteristics of the mixture measured downstream from the mixer 10.

More specifically, the control system 100 initially receives a prescribed formulation for the meat product, such as from a database. The control system 100 then receives information regarding the composition (i.e., fat content, water content, etc.) of the meats passing through the analyzers. The control system solves a set of mass balance simultaneous equations to determine whether the materials passing through the analyzers are in the proper ratios for the final meat product. To the degree that the materials are outside of a short-time-period average balance, the control system 100 will adjust the speed of one or more pumps to hold the mass balance within a tolerable range. These equations may be the same equations that would otherwise be solved by plant personnel in order to adjust the input materials based on the batch sheet, discussed above. By providing the control system 100 with standard known parameters for a mixture that will produce the desired final meat product, the control system 100 can automatically, continuously, and dynamically adjust the mixture so that the output is consistent and properly balanced. As also noted previously, in typical batch systems, the only sampling that can be done is from the mixing vat, at which point it is difficult and tedious to adjust the balances. The control system 100 and mixing device allow for a composition controlled mixture to be consistently and uniformly produced, and the tighter composition control may result in increased product yields and improved product quality.

The mixer 10 preferably includes an output port 122 for discharging the mixture, and may include an outlet hopper 124 to receive the mixture and channel it to a delivery pump 126. If it is desired to maintain the process at subatmospheric pressure, one or more vacuum lines may be in communication with the apparatus in one or more points. FIG. 1 illustrates a vacuum line 120 in communication with the inlet hopper 62. In other embodiments, vacuum lines may be connected to other locations in addition to or instead of the inlet hopper. For example, vacuum lines may be connected to the outlet hopper, to points between the inlet and outlet hoppers, and to points downstream from the outlet hopper.

As the protein extraction is a function of time and shear force in the presence of a salt solution, the power drive 12 may be a variable speed motor so that the constituents are contained within the housing 20 for mixing for a time necessary to allow both salt solution infusion and shearing action.

In connection with sensing fat, moisture and protein content of meat components, it has been found that moisture content may correlate to fat and protein content. It is believed that the correlation may be sufficient to enable moisture content of meat components from a known source to be used as a predictor of fat and/or protein content with sufficient accuracy that fat and/or protein content may effectively be measured simply by measuring moisture content. Accordingly, in certain embodiments of the invention, the step of measuring fat and/or protein content may consist of measuring moisture content after having calibrated the moisture meter appropriately. The control system can then control fat and/or protein input based on the moisture content readings of one or more input streams.

In utilizing the system described herein, plant personnel may receive a batch sheet from a database for the formulation of a particular meat product. The plant personnel may then select appropriate meats for inputting into the system based on fat, protein, and/or water content. However, the precision with which they are selected need not be as accurate, to the degree that the vendor-provided ratings may generally be relied upon. Furthermore, the system allows the meat chunks to be delivered directly into the pre-input hopper 68 which may or may not perform initial size reduction, thus eliminating the need for the injection and curing stages and their accompanying vats. At this point, the control system 100 takes over the processing of the meat and other constituents. The control system 100 itself receives or pulls automatically the batch sheet from the database and calculates the necessary mass balance equations. As described, the control system 100 monitors and adjusts the system including the pumps and mixing device to produce a generally uniform composition stable protein matrix. The output stream of meat product mixture from the mixing device may first proceed to a surge hopper to take into account minor breakdowns in the system, and may then be easily and simply conveyed to further processing steps, such as casing or form stuffing and cooking/thermal processes. The surge hopper fills from the bottom to the top, so there is very little mixing or aeration issues as a result of its use. The control system analyzes the composition needs and what is present, and adjusts accordingly. Thus, human interaction is reduced to providing the constituents, such as by loading meat into the hoppers 68, and responding to alarms or alerts from the system providing notice that there is a problem such as a constituent running out. The result is a reduction in labor, more accurate and higher yields (less yield loss), greater food safety and reduced likelihood of contamination due to the substantially closed system and lack of transfer, reduced space requirements from the elimination of the vats and coolers, improved product uniformity, and reduced maintenance due to the elimination of vat and transfer traffic, as well as savings from the elimination of the vats themselves and the injection stages.

The communication between the control system 100 and the corporate database is directed in both directions. That is, the control system 100 may receive the batch sheet of base formula, formulation rules (such as maximum fat content), and finished batter targets directly, as well as provide feedback to the database regarding the actual materials used. As the database may have a dated or inaccurate formulation, the information from the control system 100 may be uploaded to correct the formulation. In addition, the control system may provide information detailing the actual compositional rating in comparison with the vendor specific rating which is generally a small sample estimate. This allows a historical view of a specific vendor and can trend changes in meats provided by specific vendors. This feedback can be used by the database to assess materials on-hand and purchasing requirements, as well as compare the yield results to materials usage. The data collection enabled by this system can trend various aspects of the operation to search for inefficiencies and spot for improvements therein. In prior systems, the database tends to have a static formulation, while the present control system allows for dynamic repositioning of that formulation. The control system thus responds to changing materials, compensates for unavailable materials, and provides feedback for re-setting the formulation at the database.

From the foregoing, it should be appreciated that the invention provides a new and improved method for effecting protein extraction and mixing of meat components for certain processed meat products. The term "meat" is used broadly herein to refer to meat such as beef, pork, poultry, fish and meat byproducts, including cuts or pieces that are all or primarily all fat, as well as lean cuts or pieces that have relatively higher protein content. The terms "meat product" and "meat ingredient" are used broadly herein to refer to products or ingredients that contain meat, alone or in combination with other components.

The preferred embodiments described above relate to continuous processes, i.e., processes in which ingredients are input during discharge of a combined output. In these processes, the input and/or the output steps may be interrupted periodically or may be intermittent.

The preferred embodiments of the invention are believed to be effective for achieving rapid protein extraction and mixing of food components in a much smaller apparatus than that used in certain prior art batch mixing processes. In addition to reducing floor space requirements, the preferred embodiments of the invention also may reduce cost and cleanup time as compared with these prior art processes and apparatus. The invention may also result in significant cost savings by enabling more precise control of the composition of the combined output stream.

While specific embodiments have been described above, the invention is not limited to these embodiments. The invention is further described in the following claims.

The invention claimed is:

1. A method for reducing protein exudate formation on meat mixtures, the steps including:
   providing a mixer having a plurality of mixing elements in a mixer housing;

inputting a plurality of meat mixture constituents to the mixer;

applying a shear force to the constituents such that the mixing elements rotate around a shaft in the mixer housing and the shear force is applied by moving the meat mixture through openings defined between the mixing elements and the interior surface of the housing; wherein the meat mixture moves in a generally continuous manner from an input of the housing to an output; and outputting the mixture after the meat mixture has undergone sufficient protein extraction to form a stable meat mixture, wherein the shear force is applied for a period of less than thirty minutes.

2. The method of claim 1 wherein the time period is less than one minute.

3. The method of claim 2 wherein the time period is between 10 seconds and 45 seconds.

4. The method of claim 1 wherein the time period is less than is required for protein extraction to produce visible exudate.

5. The method of claim 4 wherein the extracted protein is utilized in bonding the mixture during a thermal process.

6. The method of claim 1 wherein the step of outputting the mixture includes discharging the mixture to a hopper for further processing.

7. The method of claim 6 wherein the further processing includes at least one of stuffing the mixture into a casing and delivering the mixture to a form.

8. The method of claim 7 wherein the protein extraction substantially ceases when the mixture is discharged.

9. A method for processing meat to form a low-fat and stable meat emulsion with a texture substantially similar to that of a higher-fat meat emulsion, the steps including:

providing a mixer with a pair of rotating shafts including mixing elements located thereon; and forming a meat emulsion within the mixer including:

inputting meat emulsion constituents within the mixer, the constituents including at least a first meat and a salt solution, and applying a shear force to the constituents input into the mixer sufficient to result in protein extraction, the shear force applied by rotating the mixing elements around the shafts in the mixer and by moving the meat emulsion constituents through openings defined between the mixing elements and an interior surface of the mixer; and wherein the meat emulsion constituents move in a generally continuous manner from an input to an output of the mixer, the shear force being applied to the meat emulsion constituents for a period of time of less than thirty minutes to retard the formation of extensive protein bonds.

10. The method of claim 9 wherein the constituents further includes a second meat.

11. The method of claim 9 wherein the constituents further includes additives.

12. The method of claim 9 further including combining constituents at an input end of the mixer.

13. The method of claim 9 wherein the mixer includes a housing, the steps further including:

positioning the rotating mixing elements in close proximity to each other and to the interior surface of the housing; and rotating the rotatable shafts within the mixer housing.

14. The method of claim 9 wherein the mixer includes an input end and an output end, the method further including:

forcing the constituents from the input end to the output end.

15. The method of claim 14 wherein the step of applying a shear force includes extracting protein to form a stable emulsion.

16. The method of claim 15 wherein the method further includes outputting the meat emulsion.

17. The method of claim 9 wherein the period of time is between 10 seconds and 45 seconds.

18. The method of claim 9 wherein the mixing elements may rotate to within $1/8$ inch of the interior surface of the mixer.

19. A method of continuously processing meat to extract protein to enable the meat to form a stable emulsion that may be formed into a meat product with structural integrity and with a desirable texture, the steps including:

providing a system including a mixer having a housing with an input end and an output end, and at least a first moving shaft having mixing elements for working constituents within the housing;

inputting constituents in the form of meats and additives into the system including a salt solution;

moving the constituents in a generally continuous manner from the input end towards the output end;

applying a shear force to the constituents between the mixing elements and a housing interior surface sufficient to form a stable meat emulsion by rotating the mixing elements; and outputting the stable meat emulsion within thirty minutes of inputting the constituents into the system.

20. The method of claim 19 the steps further including positioning the mixing elements in close proximity to each other and to the housing interior surface.

21. The method of claim 19 the method further including rotating the mixing elements to apply high shear force.

22. The method of claim 20 wherein the step of positioning the mixing elements includes arranging the elements on rotating shafts so as to rotate within $1/8$ inch of another mixing element.

23. The method of claim 22 wherein the moving elements may rotate to within $1/8$ inch of the housing interior surface.

24. The method of claim 19 further including the step of extracting protein to form the stable meat emulsion.

25. The method of claim 19 wherein the step of outputting is performed prior to extensive linking of protein bonds in the emulsion.

26. The method of claim 19 including outputting the stable meat emulsion in less than a minute from inputting the constituents into the system.

27. The method of claim 19 including outputting the stable meat emulsion in a time period of 10 seconds to 45 seconds from inputting the constituents into the system.

* * * * *